US010922657B2

(12) United States Patent
Bennett et al.

(10) Patent No.: US 10,922,657 B2
(45) Date of Patent: Feb. 16, 2021

(54) USING AN EMPLOYEE DATABASE WITH SOCIAL MEDIA CONNECTIONS TO CALCULATE JOB CANDIDATE REPUTATION SCORES

(71) Applicant: ORACLE INTERNATIONAL CORPORATION, Redwood Shores, CA (US)

(72) Inventors: Mark Preston Bennett, Livermore, CA (US); Tara U. Roberts, Austin, TX (US); Stacy P. Parkinson, Boulder, CO (US); Kaylin Marie Linke, Denver, CO (US)

(73) Assignee: Oracle International Corporation, Redwood Shores (CA)

( * ) Notice: Subject to any disclaimer, the term of this patent is extended or adjusted under 35 U.S.C. 154(b) by 962 days.

(21) Appl. No.: 14/835,391

(22) Filed: Aug. 25, 2015

(65) Prior Publication Data

US 2016/0063442 A1 Mar. 3, 2016

Related U.S. Application Data

(60) Provisional application No. 62/042,160, filed on Aug. 26, 2014.

(51) Int. Cl.
*G06Q 10/10* (2012.01)
*G06Q 50/00* (2012.01)

(52) U.S. Cl.
CPC ......... *G06Q 10/1053* (2013.01); *G06Q 50/01* (2013.01)

(58) Field of Classification Search
CPC ............................ G06Q 10/1053; G06Q 50/01
See application file for complete search history.

(56) References Cited

U.S. PATENT DOCUMENTS 6,321,338 B1 11/2001 Porras et al.
7,805,415 B1 * 9/2010 Flesher ................... H04L 63/12
707/694

(Continued)

OTHER PUBLICATIONS

Notice of Allowance and Fee(s) due dated Sep. 23, 2019 for related U.S. Appl. No. 15/671,092.

(Continued)

*Primary Examiner* — Lynda Jasmin
*Assistant Examiner* — Shaun D Sensenig
(74) *Attorney, Agent, or Firm* — Vista IP Law Group, LLP

(57) ABSTRACT

Systems for using social media sites in recruiting activities. Potential candidates for job openings are considered using computer-implemented analysis of an online social referral graph and a rule base. Content from one or more social data sources is retrieved and analyzed to identify potential candidates for a job opening. The potential candidate's social data comprises information used as a reputation score pertaining to the potential candidate and as a reputation score pertaining to the potential candidate's social connections. An employee database is cross referenced to find a match between employees and any of the potential candidate's social connections. A referral score based on an influence contribution measure, a clout contribution measure, a generosity contribution measure, an activity contribution measure, an impact contribution measure, or an engagement contribution measure is calculated. When the reputation score and/or the referral score meets or exceeds a threshold, the potential candidate is considered for outreach.

20 Claims, 17 Drawing Sheets

(56) References Cited

U.S. PATENT DOCUMENTS

| | | |
|---|---|---|
| 7,974,983 B2 | 7/2011 | Goeldi |
| 8,078,741 B2 | 12/2011 | Barnfield et al. |
| 8,224,851 B2 | 7/2012 | Banda et al. |
| 8,312,056 B1 | 11/2012 | Peng et al. |
| 8,447,852 B1 | 5/2013 | Penumaka |
| 8,554,635 B2 | 10/2013 | England |
| 8,706,548 B1 | 4/2014 | Blume et al. |
| 8,856,056 B2 | 10/2014 | Di Sciullo |
| 8,856,165 B1 | 10/2014 | Cierniak |
| 8,924,382 B2 | 12/2014 | Banda et al. |
| 9,117,058 B1 | 8/2015 | Ansari et al. |
| 9,224,130 B2 | 12/2015 | Klaus et al. |
| 9,424,612 B1* | 8/2016 | Bright .............. G06F 17/30867 |
| 2002/0157023 A1 | 10/2002 | Callahan et al. |
| 2006/0173957 A1 | 8/2006 | Robinson |
| 2006/0248045 A1 | 11/2006 | Toledano et al. |
| 2006/0282328 A1 | 12/2006 | Gerace et al. |
| 2007/0067210 A1 | 3/2007 | Rishell et al. |
| 2007/0100779 A1 | 5/2007 | Levy et al. |
| 2007/0121843 A1 | 5/2007 | Atazky et al. |
| 2007/0124432 A1 | 5/2007 | Holtzman |
| 2007/0150335 A1 | 6/2007 | Arnett et al. |
| 2008/0040151 A1 | 2/2008 | Moore |
| 2008/0294624 A1 | 11/2008 | Kanigsberg |
| 2008/0313000 A1 | 12/2008 | Degeratu et al. |
| 2009/0012760 A1 | 1/2009 | Schunemann |
| 2009/0112841 A1 | 4/2009 | Devarakonda |
| 2009/0157511 A1 | 6/2009 | Spinnell |
| 2009/0172773 A1 | 7/2009 | Moore |
| 2009/0254529 A1 | 10/2009 | Goldentouch |
| 2009/0265221 A1 | 10/2009 | Woods et al. |
| 2010/0070517 A1 | 3/2010 | Ghosh et al. |
| 2010/0119053 A1 | 5/2010 | Goelidi |
| 2010/0121707 A1 | 5/2010 | Goelidi |
| 2010/0121843 A1 | 5/2010 | Goelidi |
| 2010/0169331 A1* | 7/2010 | Karidi .................. G06F 16/951 707/754 |
| 2010/0179915 A1* | 7/2010 | Nastacio ............... G06Q 30/02 705/319 |
| 2010/0274912 A1 | 10/2010 | Barnfield et al. |
| 2010/0293126 A1 | 11/2010 | Lang et al. |
| 2010/0306049 A1 | 12/2010 | Kakade et al. |
| 2011/0029567 A1 | 2/2011 | Banda et al. |
| 2011/0035674 A1 | 2/2011 | Chenoweth et al. |
| 2011/0055017 A1 | 3/2011 | Solomon et al. |
| 2011/0055098 A1 | 3/2011 | Stewart |
| 2011/0112899 A1 | 5/2011 | Strutton |
| 2011/0125550 A1 | 5/2011 | Erhart |
| 2011/0125793 A1 | 5/2011 | Erhart et al. |
| 2011/0145064 A1 | 6/2011 | Anderson et al. |
| 2011/0179061 A1 | 7/2011 | Chilakamarri |
| 2011/0191417 A1 | 8/2011 | Rathod |
| 2011/0208822 A1 | 8/2011 | Rathod |
| 2011/0214157 A1 | 9/2011 | Korsunsky et al. |
| 2011/0258049 A1 | 10/2011 | Ramer et al. |
| 2011/0258560 A1 | 10/2011 | Mercuri et al. |
| 2011/0270649 A1 | 11/2011 | Kerho |
| 2011/0276505 A1* | 11/2011 | Schmitt ................ G06Q 10/105 705/321 |
| 2011/0313996 A1 | 12/2011 | Strauss |
| 2011/0320542 A1 | 12/2011 | Bendel |
| 2012/0036006 A1 | 2/2012 | Mauro |
| 2012/0134271 A1 | 5/2012 | Gantenbein et al. |
| 2012/0185764 A1 | 7/2012 | Ball et al. |
| 2012/0282576 A1 | 11/2012 | Chenoweth et al. |
| 2012/0331063 A1 | 12/2012 | Rajaram |
| 2013/0014137 A1 | 1/2013 | Bhatia |
| 2013/0060864 A1 | 3/2013 | Ehms |
| 2013/0080264 A1 | 3/2013 | Umeda |
| 2013/0086089 A1 | 4/2013 | Banda et al. |
| 2013/0132864 A1 | 5/2013 | Panigrahi et al. |
| 2013/0159451 A1 | 6/2013 | Luciw |
| 2013/0178956 A1 | 7/2013 | Vashist et al. |
| 2013/0191299 A1 | 7/2013 | Hermsdorff |
| 2013/0262168 A1 | 10/2013 | Makanawala et al. |
| 2013/0282605 A1 | 10/2013 | Noelting |
| 2013/0291060 A1 | 10/2013 | Moore |
| 2013/0325733 A1 | 12/2013 | Wu et al. |
| 2013/0339379 A1 | 12/2013 | Ferrari et al. |
| 2014/0019457 A1 | 1/2014 | Xie |
| 2014/0020083 A1 | 1/2014 | Fetik |
| 2014/0032659 A1 | 1/2014 | Marini |
| 2014/0059495 A1 | 2/2014 | Klaus et al. |
| 2014/0074551 A1 | 3/2014 | Setayesh et al. |
| 2014/0074844 A1 | 3/2014 | Subramanian et al. |
| 2014/0082070 A1 | 3/2014 | Chakraborty et al. |
| 2014/0114959 A1 | 4/2014 | Sankhla |
| 2014/0143004 A1 | 5/2014 | Abhyanker |
| 2014/0156681 A1 | 6/2014 | Lee |
| 2014/0173643 A1 | 6/2014 | Bhatia |
| 2014/0180788 A1 | 6/2014 | George et al. |
| 2014/0257921 A1 | 9/2014 | Bear et al. |
| 2014/0258161 A1* | 9/2014 | Brown ............... G06Q 10/1053 705/321 |
| 2014/0259094 A1 | 9/2014 | Narayanaswamy et al. |
| 2014/0270145 A1 | 9/2014 | Erhart et al. |
| 2014/0282098 A1 | 9/2014 | McConnell |
| 2014/0297550 A1 | 10/2014 | Miller |
| 2015/0006414 A1 | 1/2015 | Janapareddy |
| 2015/0127565 A1 | 5/2015 | Chevalier |
| 2015/0149390 A1 | 5/2015 | Brdiczka et al. |
| 2015/0170152 A1 | 6/2015 | Shaffer et al. |
| 2015/0347973 A1 | 12/2015 | Singh |
| 2016/0063381 A1 | 3/2016 | Allen et al. |
| 2016/0078108 A1 | 3/2016 | Klaus et al. |
| 2016/0092837 A1 | 3/2016 | Panigrahi et al. |
| 2019/0278821 A1 | 9/2019 | Doyd et al. |

OTHER PUBLICATIONS

Non-Final Office Action dated Feb. 10, 2017 for related U.S. Appl. No. 14/498,612.
Final Office Action dated Jun. 21, 2017 for related U.S. Appl. No. 14/498,612.
Advisory Action dated Sep. 5, 2017 for related U.S. Appl. No. 14/498,612.
Non-Final Office Action dated Nov. 3, 2017 for related U.S. Appl. No. 14/498,612.
Final Office Action dated May 11, 2018 for related U.S. Appl. No. 14/498,612.
Notice of Allowance dated Jul. 25, 2018 for related U.S. Appl. No. 14/498,612.
Non-Final Office Action dated Jan. 25, 2019 for related U.S. Appl. No. 16/185,622.
Final Office Action dated Aug. 7, 2019 for related U.S. Appl. No. 16/185,622.
Advisory Action dated Oct. 23, 2019 for related U.S. Appl. No. 16/185,622.
Non-Final Office Action dated Mar. 19, 2020 for related U.S. Appl. No. 16/185,622.
Third-Party Submission under 37 CFR 1.290 dated Apr. 3, 2014 for related U.S. Appl. No. 14/021,820.
Non-final Office Action dated Aug. 11, 2016 for related U.S. Appl. No. 14/021,820.
Non-final Office Action dated Oct. 7, 2016 for related U.S. Appl. No. 14/021,798.
Non-final Office Action dated Apr. 21, 2016 for related U.S. Appl. No. 14/021,798.
Final Office Action dated Jun. 17, 2016 for related U.S. Appl. No. 14/040,565.
Notice of Allowance and Fee(s) due dated Mar. 28, 2017 for related U.S. Appl. No. 14/021,798.
Notice of Allowance and Fee(s) due dated Nov. 30, 2016 for related U.S. Appl. No. 14/040,565.
Non-final Office Action dated Jan. 16, 2015 for related U.S. Appl. No. 14/040,565.
Final Office Action dated May 5, 2015 for related U.S. Appl. No. 14/040,565.
Final Office Action dated Nov. 23, 2015 for related U.S. Appl. No. 14/021,798.

(56) References Cited

OTHER PUBLICATIONS

Non-final Office Action dated Dec. 30, 2015 for related U.S. Appl. No. 14/040,565.

* cited by examiner

4A00

| Keyword(s) | ID |
|---|---|
| "need a job" | 1 |
| "looking for a job" | 2 |
| "searching for job" | 3 |
| "starting career" | 4 |
| "deciding career" | 5 |
| "getting career" | 6 |
| "job hunt" | 7 |
| "job hunting" | 8 |
| "job seeking" | 9 |
| "job searching" | 10 |
| "job search" | 11 |
| "looking for job" | 12 |
| "looking for career" | 13 |
| "career searching" | 14 |
| "career search" | 15 |
| "find job" | 16 |
| "finding job" | 17 |
| "looking for job" | 18 |
| "look for job" | 19 |
| "have to get job" | 20 |
| "want to get job" | 21 |
| "my resume" | 22 |
| "have references" | 23 |
| "provide references" | 24 |
| "where apply" | 25 |
| "how apply" | 26 |
| "looking for work" | 27 |
| "seeking work" | 28 |
| "look for word" | 29 |
| "want find job" | 30 |
| "would like job" | 31 |
| "I'm applying" | 32 |
| "I applying" | 33 |
| "want apply for job" | 34 |
| "want apply for jobs" | 35 |
| "gonna apply for job" | 36 |
| "gonna apply for jobs" | 37 |
| "going apply for job" | 38 |
| "going apply for jobs" | 39 |
| "need apply for job" | 40 |
| "need apply for jobs" | 41 |
| "have apply for jobs" | 42 |
| "applying for job" | 43 |
| "applying for jobs" | 44 |
| "want find job" | 45 |
| "would like job" | 46 |
| "try get job" | 47 |
| "trying get job" | 48 |
| "need get job" | 49 |

FIG. 4A

USING AN EMPLOYEE DATABASE WITH SOCIAL MEDIA CONNECTIONS TO CALCULATE JOB CANDIDATE REPUTATION SCORES

RELATED APPLICATIONS

The present application claims the benefit of priority to U.S. Patent Application Ser. No. 62/042,160, entitled "METHOD AND SYSTEM FOR IDENTIFYING AND ASSESSING JOB CANDIDATES USING SOCIAL MEDIA", filed Aug. 26, 2014 which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of using social media sites in recruiting activities, and more particularly to techniques for cross-referencing an employee database with social media connections to calculate job candidate reputation scores.

BACKGROUND

Employee referrals have long been used in enterprise recruiting. Indeed, it is often the case that an employee referral of a candidate is a referral that is given special accordance. In some cases, the employee doing the referring of the candidate can offer valuable insight into the candidate, and in some cases, the insight offered by the referring employee cannot be easily obtained using other recruiting methods. Thus, employee referrals are highly valued.

In legacy situations a recruiter might administer an "employee referral program" in the hope that an employee can identify a candidate to fill a position. Or, in legacy situations, a recruiter might just be "lucky" enough to find out that a candidate is a person who is known by an employee. This legacy method fails to take advantage of the vast corpus of data pertaining to both candidates and employees. What is needed is a way to find out if a particular candidate is a "known quantity" to any of the enterprise's employees.

Given the widespread availability and usage of the internet and social media, recruiters have become interested in being able to monitor and leverage the content and commentary provided by social networks in order to identify qualified candidates to match to job openings. Interactive websites and other corpora such as social networks and blogs provide a wealth of useful information that can be advantageously used by a business to discover and assess various qualities of these potential candidates, however the use of such corpora for seeking employee commentary or assessment as pertaining to a candidate has not been exploited.

None of the aforementioned legacy approaches achieve the capabilities of the herein-disclosed techniques for cross-referencing an employee database with social media connections to calculate job candidate reputation scores. Therefore, there is a need for improvements.

BRIEF DESCRIPTION OF THE DRAWINGS

The drawings described below are for illustration purposes only. The drawings are not intended to limit the scope of the present disclosure.

FIG. 4A is a diagram showing characteristics of semantic filter keywords as used in systems for cross-referencing an employee database with social media connections to calculate job candidate reputation scores, according to an embodiment.

DETAILED DESCRIPTION

Figure 1A:
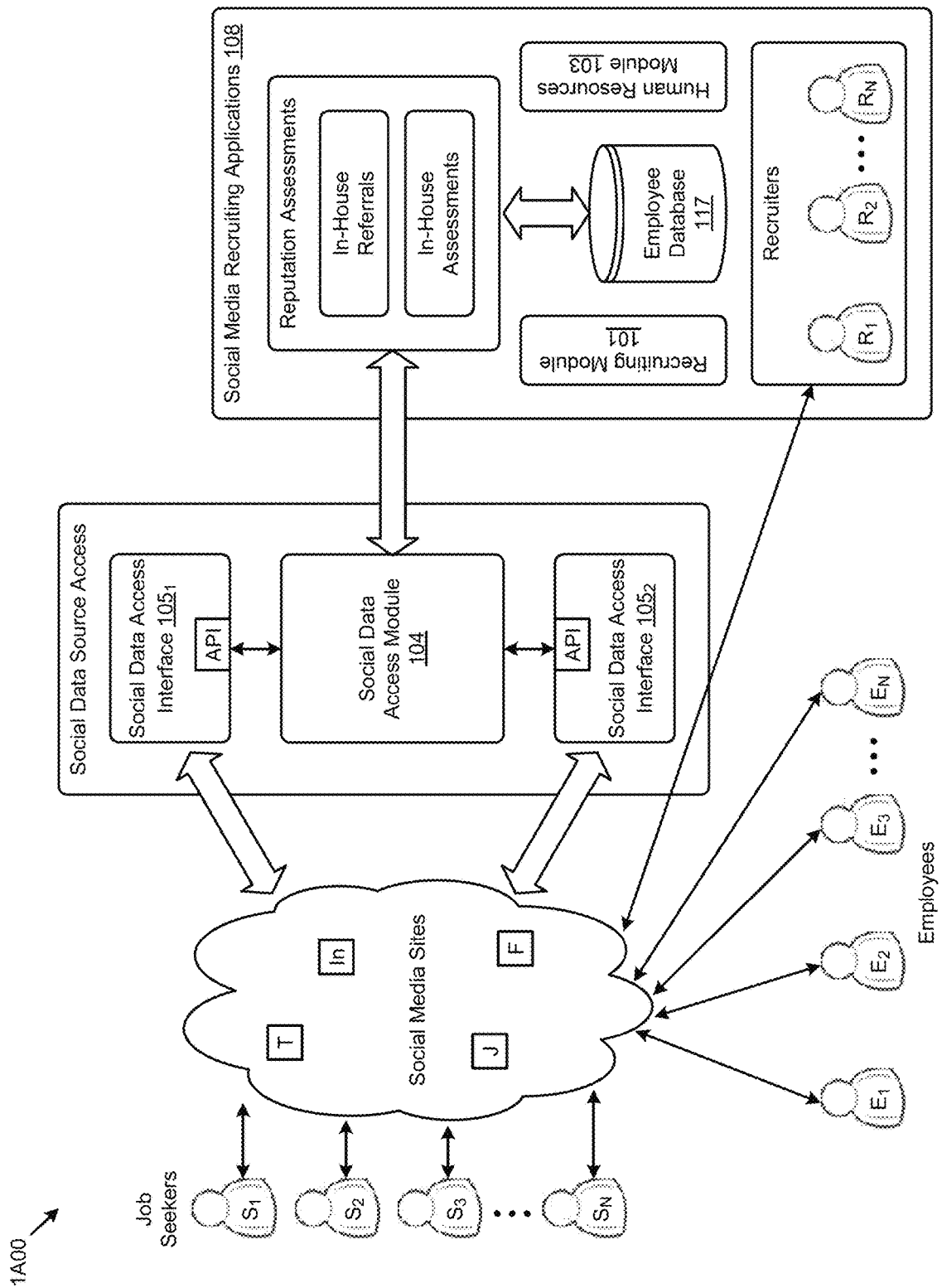
FIG. 1A depicts an environment having social media sites and recruiting applications in an enterprise setting.

Some embodiments of the present disclosure address the problem of obtaining employee proffered character references and reputation information pertaining to a job seeker and some embodiments are directed to approaches for cross-referencing the employee's social media connections to determine the existence of a connection that can be used for outreach to the employee when inquiring about a job candidate's reputation. More particularly, disclosed herein and in the accompanying figures are exemplary environments, systems, methods, and computer program products for cross-referencing an employee database with social media connections to calculate job candidate reputation scores.

Overview

One way to exploit the availability of online interactive websites and other corpora is to provide enterprise business applications that recruiters can interact with so as to take actions based on data originating from, or cross-referenced from online social media sources in order to identify and gain insight into the qualifications and reputation of potential qualified job candidates. For example, an enterprise can host a recruiting system, and that recruiting system could be configured to cross-correlate interested job seekers with employees of the enterprise who know or are otherwise connected with the job seeker.

Social media sites and other sources of online data can be used to identify job seekers who might be qualified for a position offered by an enterprise. Further, the employees or agents of an enterprise (e.g., contractors, employees or agents of suppliers, employees or agents of customers, etc.) can offer insight into and/or confirmation of characteristics of a job seeker. One way to facilitate or exploit the fact that an employee or agent of an enterprise might be a source of character references or other reputation information is to actively cross-reference such employees or agents against the job seeker using "connections" or other relationship indicators that are available at the aforementioned social media sites.

The present disclosure is directed to an approach for identifying and assessing potential candidates for job openings using social media information. Various embodiments are capable of monitoring social media content to identify potential candidates for job openings within an enterprise. In addition, social media connections between a potential candidate and one or more employees of the enterprise can be identified in order to engage employees in the process of assessing the quality and reputation of the potential candidate. The social media activity of the candidate can also be monitored in order to assess the suitability of the candidate for a particular position.

Shown and discussed below are ways to exploit the use of interactive websites and other corpora by configuring business applications to interact with social media sites, and to take action based on data originating from or cross-referenced from online social media sources. For example, an enterprise can host a recruiting system in a real-work environment (see FIG. 1A), and that recruiting system can be configured to cross-correlate interested job seekers with employees or agents of the enterprise who know or are otherwise connected with the job seeker. Furthermore, an enterprise can motivate employees or agents to engage with social media sites that are in turn are used by recruiters to identify and assess job seekers. In some cases, instead of waiting for interested job seekers to apply to a given job opening, an employee referral program can be used to identify and assess candidates for the job opening through social networks. Various modules can be configured to use employee referral information to when performing recruiting outreach to candidates.

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A depicts an environment 1A00 having social media sites and recruiting applications in an enterprise setting. As an option, one or more instances of environment 1A00 or any aspect thereof may be implemented in the context of the architecture and functionality of the embodiments described herein. Also, the environment 1A00 or any aspect thereof may be implemented in any desired environment. The environment relates data and activities in or around the shown social media sites to data and activities in or around an enterprise.

As shown the social media sites might include Facebook, Twitter, LinkedIn, Jive, and any other social media sites, and such social media sites can be accessed by any social media users in any role (e.g., job seekers $S_1, S_2, S_3, \ldots S_N$, employees $E_1, E_2, E_3, \ldots E_N$, and recruiters $R_1, R_2, \ldots R_N$).

The enterprise data and activities can include operation of one or more social media recruiting applications 108. The activities carried out by social media users in any role can involve interactions with or through various computing systems (e.g., servers and devices). Social media users can be interconnected by one or more networks such as a wireless network and/or a wired network, etc. The network can comprise any combination of a wide area network (e.g., WAN), local area network (e.g., LAN), cellular network, wireless LAN (e.g., WLAN), or any such means for enabling communication of computing systems. The network or networks can also collectively be referred to as the Internet.

Social media users in any role can interact with the social media sites using any form or forms of client devices (e.g., a desktop computer, a laptop computer, an IP phone, a smart phone, a tablet, etc.) having hardware and software (e.g., a web browser application) capable of processing and displaying information (e.g., web page, graphical user interface, etc.), and communicating information (e.g., social network posts, blog entries, "like" or "plus" indications, job posting replies, account settings, etc.). As used herein, any social media user can engage in any type of interaction with any other social media user.

The social media sites can be accessed by a social media recruiting application using any forms of online social data source accesses. The specific online social data sources accessed as shown in FIG. 1A uses a social data access module 104 that is connected to one or more of the social media recruiting applications 108, and is connected in turn to social media sites via any one or more application programming interfaces (APIs). The APIs can be implemented in, and/or observed by, any instances of site-specific social data access interfaces (e.g., site-specific social data access interfaces $105_1$, site-specific social data access interface $105_2$, etc.).

The social media recruiting applications 108 can comprise a recruiting module 101, a human resources (HR) module 103, and an employee database 117. Recruiters $R_1, R_2, \ldots R_N$ can use any of the aforementioned applications in order to identify and screen job seekers, and to perform reputation assessments. The reputation assessments can include in-house assessments made on the basis of in-house referrals, or reputation assessments can be made after cross-referencing a job seeker with an employee database (e.g., to identify connections between a job seeker and one or more employees), and then soliciting an employee for his or her assessment of the job seeker's qualifications and reputation.

Figure 1B:
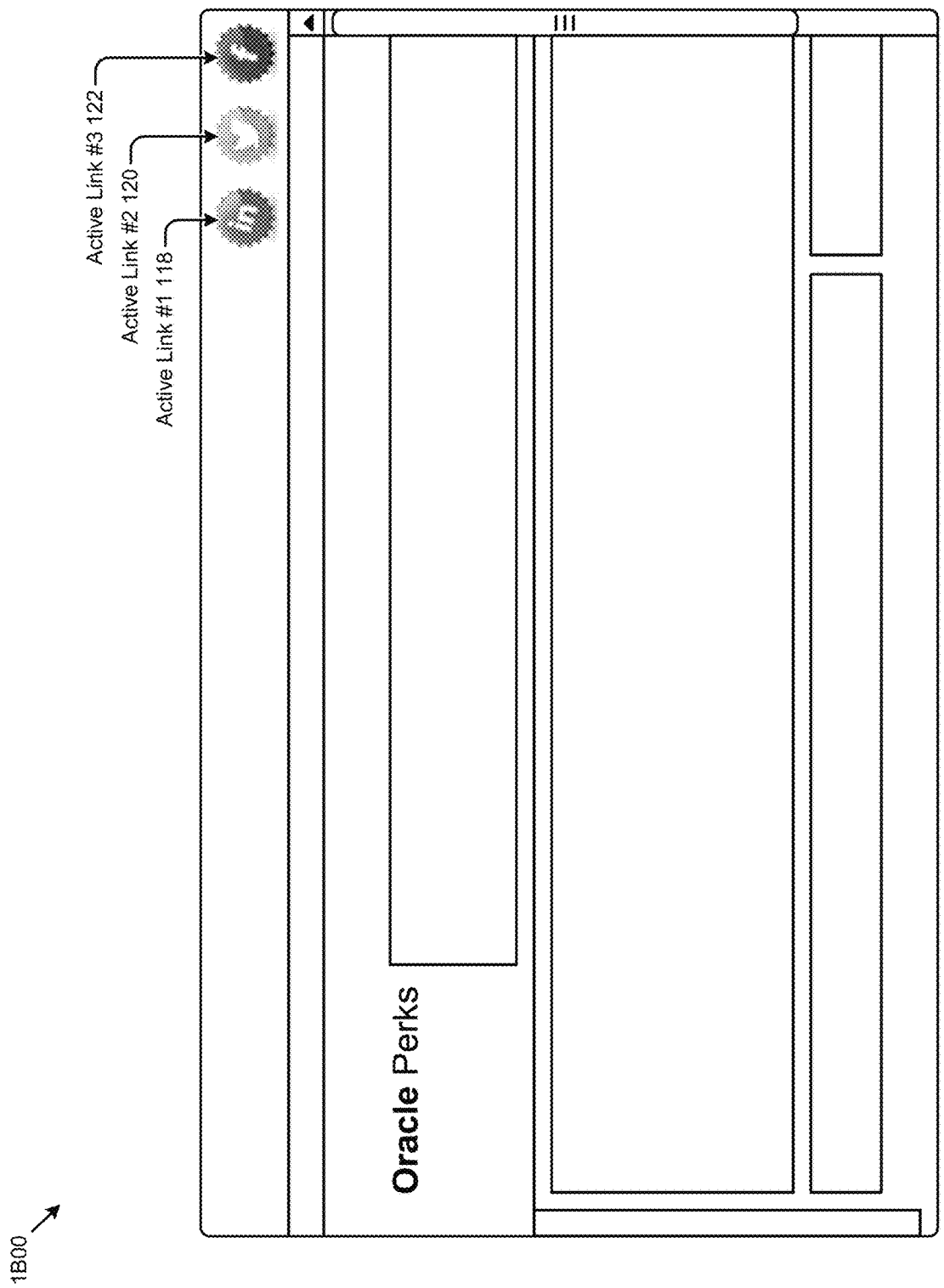
FIG. 1B depicts a user interface to stimulate employees to create social media connections, according to some embodiments.

FIG. 1B depicts a user interface 1B00 to stimulate employees to create social media connections. As an option, one or more instances of user interface 1B00 or any aspect thereof may be implemented in the context of the architecture and functionality of the embodiments described herein. Also, the user interface 1B00 or any aspect thereof may be implemented in any desired environment.

In some situations, connections between a job seeker and one or more employees might be present merely because both the job seeker the subject employee access the same social media site(s) and have opted-in to share connections. In other cases, employees might be incented to participate in such social sites. Strictly as one example, an enterprise might foster employee participation in employee referral programs (e.g., by offering "perks") and/or by simply making it easy and culturally consonant to participate in social media site activities—especially if the participation results in new connections being established by an employee to the labor force at large.

The user interface 1B00 to stimulate employees to create social media connections is merely one technique to foster employee participation in social media sites so as to create social media connections. The same, similar, or other techniques might be used by the enterprise in many places throughout the enterprise. In particular, any one or more enterprise applications can host suggestions or motivations intended to foster employee participation in social media sites so as to create social media connections with individuals (e.g., current or future job seekers). In some cases active links (e.g., active link 118, active link 120, and active link 122) are presented so as to foster employee interaction with social media sites.

Figure 1C:
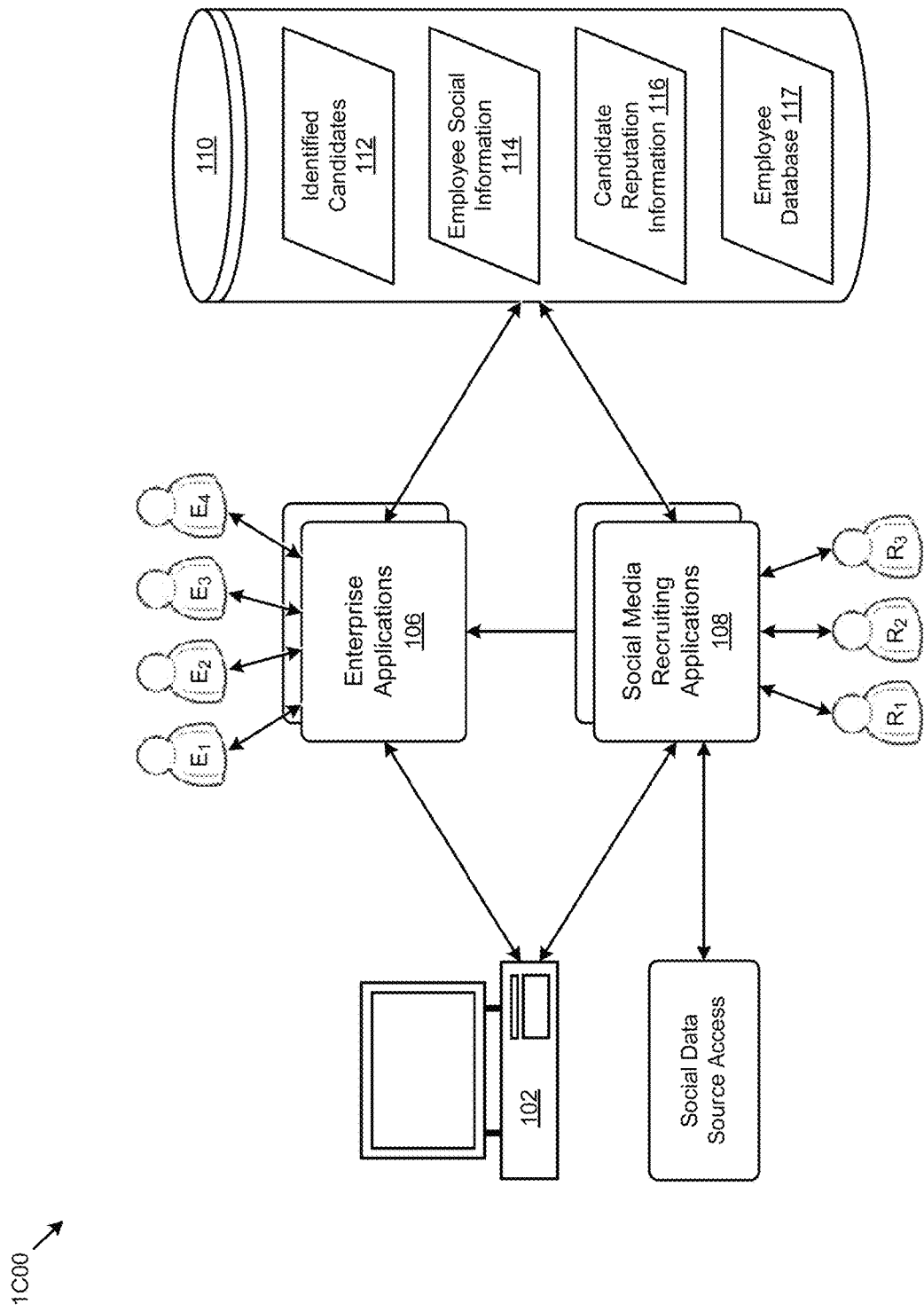
FIG. 1C depicts a partitioning for deploying a system for cross-referencing an employee database with social media connections to calculate job candidate reputation scores, according to an embodiment.

FIG. 1C depicts a partitioning 1C00 for deploying a system for cross-referencing an employee database with social media connections to calculate job candidate reputation scores. As an option, one or more instances of partitioning 1C00 or any aspect thereof may be implemented in the context of the architecture and functionality of the embodiments described herein. Also, the partitioning 1C00 or any aspect thereof may be implemented in any desired environment.

FIG. 1C illustrates an example partitioning of a system that may be employed in some embodiments to implement analysis and integration of social media data with enterprises and enterprise applications in order to identify and access candidates for job. The system includes one or more users at one or more user stations 102 that use the system to operate the enterprise application 106 and/or the social media recruiting applications 108. The user station 102 comprises any type of computing station that may be used to operate or interface with any of the applications depicted in system, possibly including any of the heretofore-described user devices. The user station 102 may comprise a display device, such as a display monitor, for displaying a user interface to users at the user station. The user station 102 may also comprise one or more input devices for the user to provide operational control over the activities of the system—such as a mouse, keyboard, touchscreen, or joystick—to manipulate a pointing object in a graphical user interface to generate user inputs to the enterprise application and/or the social networking application.

According to some embodiments, integration is provided between an enterprise application 106 and a social media recruiting application. The enterprise application 106 comprises any business-related application that provides visibility and control over various aspects of a business. Such enterprise/business applications can include, without limitation, customer relations management ("CRM") applications, enterprise resource planning ("ERP") applications, supply chain management applications, and other applications dealing with various finance, accounting, manufacturing, human resources, and/or distribution functions, to name but a few examples. Exemplary enterprise application suites include, without limitation, Oracle Fusion, Oracle eBusiness Suite, JD Edwards Enterprise One, Oracle Cloud, PeopleSoft, and Siebel, all of which are available from Oracle Corporation of Redwood Shores, Calif.

The social media recruiting applications 108 provides a framework for using social media information and/or social network connections for identifying, assessing, and engaging with job candidates. The social media recruiting applications 108 may receive data from one or more online social media data sources. Such social data sources may include, for example, websites such as a social network, blog, microblog, or web feed (e.g., Facebook, Twitter, Blogger, LinkedIn, and RSS). The content may include one or more comments (e.g., Facebook comment, Tweet, comment to a blog post, reply to a previous comment, etc.) or uploaded postings (e.g., images and associated metadata, text, rich media, URLs, etc.) at one or more sources. The content may also include profile information (e.g., Facebook profile information, LinkedIn profile information, etc.). The social data/content may therefore comprise a variety of forms and/or types.

Social media recruiting applications 108 may be used to perform a variety of actions on social data. For example, semantic filtering and analysis may be performed upon the social data. Based upon this analysis, rich-content tags may be associated with the content to identify job seekers (e.g., identified candidates 112) for job openings. In some embodiments, rich-content tags may also be associated with candidates based at least in part upon their social network activity and/or social network connections. A user, such as a community manager or HR personnel may then view the identified candidates 112, monitor their social network activity, respond to social network messages by the candidates, and otherwise interact with the identified candidates 112. In some embodiments, tagged social media content and candidates can be dispatched to the enterprise application(s), based at least in part upon the tags, for performing further business processing.

In some embodiments, social media recruiting applications 108 may identify social media connections between identified candidates 112 and business employees through employee social information 114, possibly in conjunction with an employee database 117. Connections between candidates and employees may be leveraged to assess the quality or suitability of the candidate, which will be covered in additional detail below.

In some embodiments, social media activity for identified candidates 112 may be monitored and used to calculate a candidate's reputation information 116 which may be stored and/or used to assess how well the candidates match up to open positions.

The identified candidates 112, employee social information 114, candidate reputation information 116, and employee database 117 can comprise employee identification data and employee role and biographical data, and any contents of employee database 117 can be stored in any form (e.g., a file or a table) and/or on any computer readable storage device 110 such as in a hard drive, or within a database engine and/or in or on a non-volatile storage medium. The computer readable storage device 110 comprises any combination of hardware and software that allows for ready access to the data that is located on the computer readable storage device. For example, the computer readable storage device 110 could be implemented as computer memory operatively managed by an operating system. The computer readable storage device 110 could also be implemented as an electronic database system or cluster having storage on persistent and/or non-persistent storage.

Figure 2:
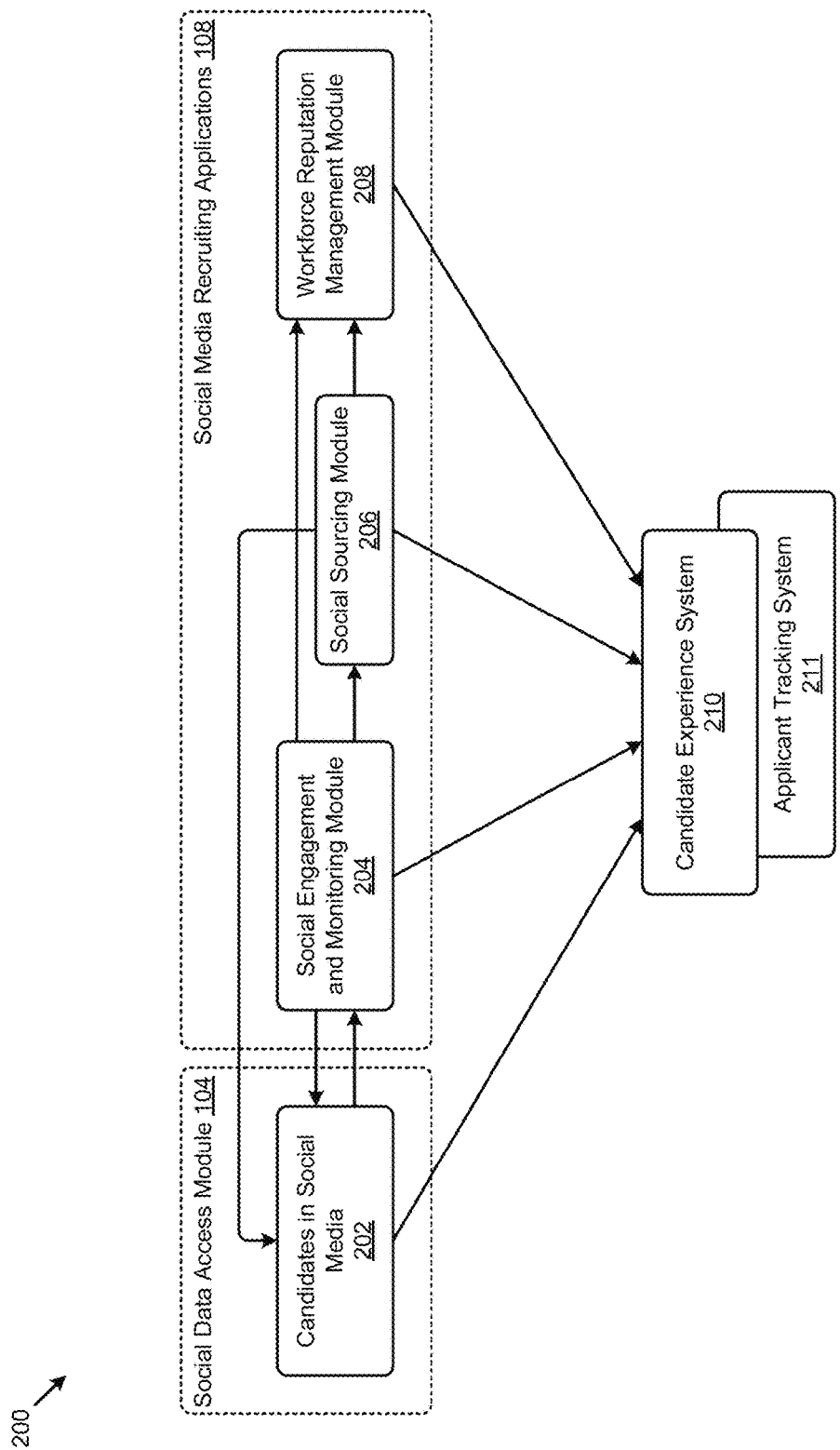
FIG. 2 exemplifies an architecture for implementing systems for cross-referencing an employee database with social media connections to calculate job candidate reputation scores, according to an embodiment.

FIG. 2 exemplifies an architecture 200 for implementing systems for cross-referencing an employee database with social media connections to calculate job candidate reputation scores. As an option, one or more instances of architecture 200 or any aspect thereof may be implemented in the context of the architecture and functionality of the embodiments described herein. Also, the architecture 200 or any aspect thereof may be implemented in any desired environment.

FIG. 2 illustrates an architecture for a social media recruiting application in accordance with some embodiments. The shown social media recruiting applications 108 comprise a plurality of modules used to identify and engage with potential job opening candidates, such as a social engagement and monitoring module 204, a social sourcing module 206, and/or a workforce reputation management module 208.

In some embodiments, candidates in social media 202 are identified through social engagement and monitoring module 204. In addition, social engagement and monitoring module 204 may be used to monitor the identified candidates, and take actions concerning the identified candidates (e.g., send messages to the identified candidates).

In some embodiments, once identified through social engagement and monitoring module 204, candidates may be processed by social sourcing module 206 and/or workforce reputation management module 208. In some embodiments, social sourcing module 206 may be used to examine connections between candidates and other social network users (such as company employees) in order to assess and evaluate the candidate for particular job openings. Social sourcing module 206 may also be used to leverage connections between company employees and other social network users in order to promote job openings to qualified candidates.

In some embodiments, workforce reputation management module 208 may be used to monitor an identified candidate using the candidate's social media activity (e.g., activity on social media sites such as Facebook, Twitter, or LinkedIn) in order to determine a "reputation" for the selected candidate. Reputation information may be used to determine how well matched a particular candidate is to a particular job opening by assessing their skills, work history, or other factors that can be determined from the candidate's social media activity.

Identified candidates may be directed to a candidate experience system 210 and/or to an applicant tracking system 211 where the candidate can formally apply for the job opening (e.g., by submitting a cover letter and/or CV). This may be done at any point by any of the above modules when it has been determined that the candidate has satisfied certain requirements or qualifications (e.g., identification as a real person and authentication of same).

In some embodiments, candidates in social media 202 may be directly connected to social sourcing module 206 or workforce reputation management module 208 without being first identified through social engagement and monitoring module 204. In some embodiments, this may be due to candidates in social media 202 making an affirmative election to undergo the social sourcing or workplace reputation process. In some embodiments, candidates in social media 202 may also choose to apply directly through candidate experience system 210 and/or through applicant tracking system 211 from any of the above-described modules, or even without being interacting with a social media recruiting application at all.

Social Engagement and Monitoring

Figure 3:
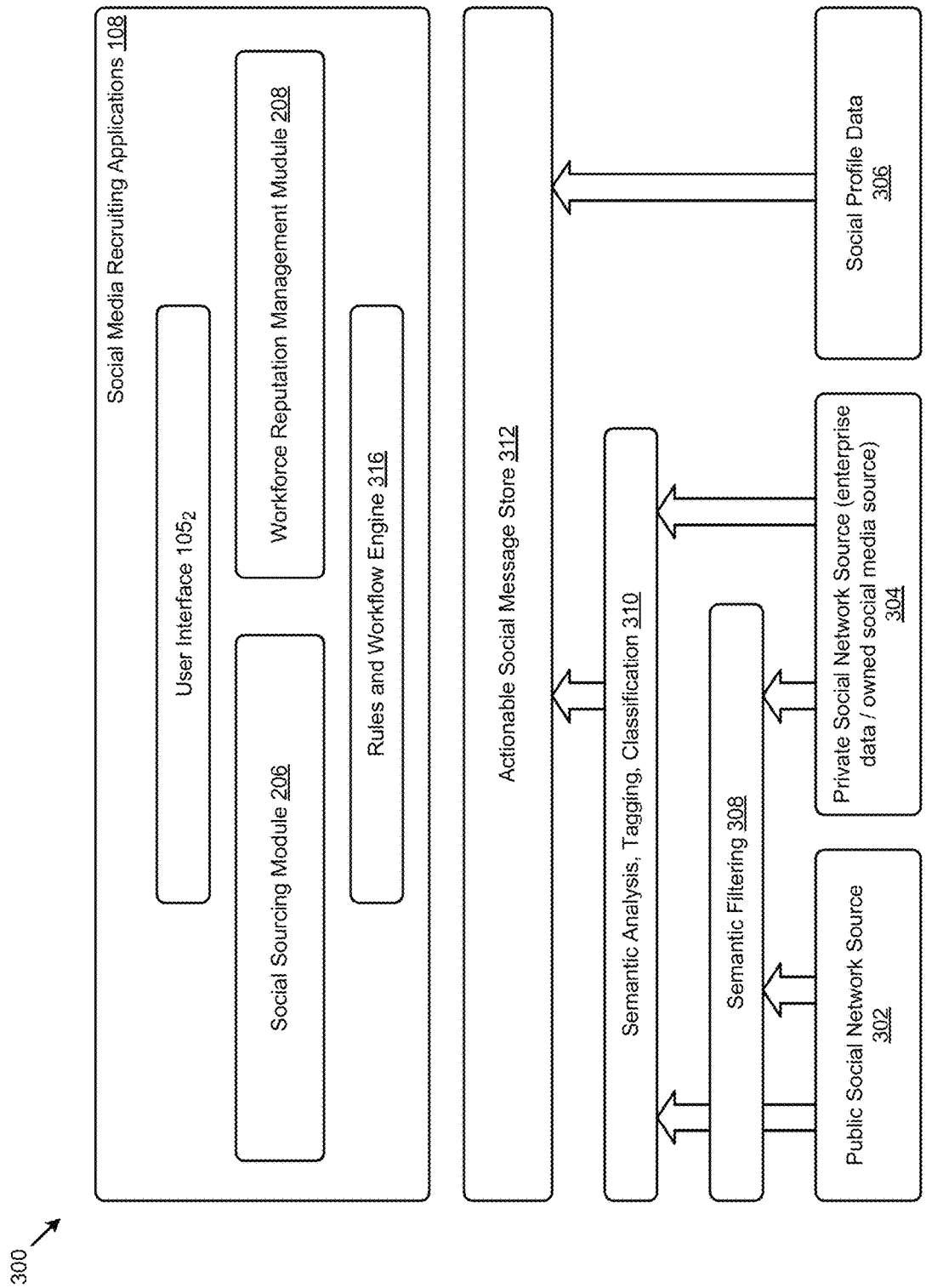
FIG. 3 illustrates an architecture for implementing a social media recruiting application, according to some embodiments.

FIG. 3 illustrates an architecture 300 for implementing a social media recruiting application. As an option, one or more instances of architecture 300 or any aspect thereof may be implemented in the context of the architecture and functionality of the embodiments described herein. Also, the architecture 300 or any aspect thereof may be implemented in any desired environment.

FIG. 3 shows an architecture for implementing a social engagement and monitoring module in accordance with some embodiments of the disclosure. Data from one or more social network systems are received into the system. The social data may be either public social network sources 302 or private social network sources 304. Public social network data/messages include, for example, publically available content from public blog sites, twitter messages, RSS data, and social media sites such as Facebook. Private social network data/messages include, for example, content from internal company social networking sites.

In some embodiments, the data that is received for processing includes non-social data. Such data includes, for example, enterprise data from non-public sources (e.g., email, chats, transcribed phone conversations, transcribed videos, private social network sources 304, etc.)

Semantic analysis is performed upon the received data. For example, latent semantic analysis (LSA), an advanced form of statistical language modeling, can be used to perform semantic analysis upon the social data. This permits the system to understand the contextual and semantic significance of terms that appear within the social data. This type of analysis can be used, for example, to understand the difference between the term "Galaxy" as used in an astronomy context, "Galaxy" as used for the name of a professional soccer team, and "Galaxy" as used for the name of a line of mobile devices.

Semantic filtering 308 is a mechanism that is provided to minimize miss-categorizations of the social data. Much of the social data is likely to contain content which is of very little interest to a business organization. Semantic filtering is used to remove the irrelevant material from the social data to reduce the occurrence of false positives, false negatives, and inappropriate responses/rejections within the actionable data. This permits the resulting data to be more relevant and accurate when provided to the enterprise applications.

In some embodiments, all social data content is subject to semantic filtering to reduce the excess "noise" of irrelevant data. In an alternate embodiment, only public social network content undergoes semantic filtering, such that the private social network content is not subject to the semantic filtering. This embodiment is based on the assumption that the public social network content is more likely to contain data of little interest to the enterprise. In yet another embodiment, both the public and private social network data are subject to semantic filtering, but the filtering is handled differently so that greater levels/intensity of filtering can be imposed on the public data as opposed to the private data.

The system performs semantic analysis, tagging and classification 310 to the social media data. This permits the system to create and apply filters to identify themes, and to cluster together like-minded messages, topics, conversations, and content. There are numerous ways that can be taken to semantically categorize the social network content. The categorizations and classifications can be performed with an eye towards identifying, for example, social network users interested in finding a job, interest in particular job openings, and skills and qualifications of interested job seekers.

Based upon the semantic analysis, tagging and classification 310, tags are identified and associated with the social network content. The tags correspond to areas of analytical importance with respect to the organizations that will be consuming the results of the analysis. For example, a business may seek to use the system to analyze social network data to tag and identify potential job candidates and the job openings they are interested in. The categorized and tagged social media data may be stored as an actionable social message store 312 from which candidates may be identified and acted upon (e.g., sent to social sourcing module 206 or workforce reputation management module 208).

In some embodiments, social profile data 306 may also be accessed and associated with the originator of specific items of social network content. This profile data includes, for example, information about the social "importance" of that person. The aforementioned "importance" of that person can be quantified by any number of reputation measures, which can include a generosity measure (e.g., based on how often the user reposts other's posts), an influence measure (e.g., based on how often the user's material is reposted by others), an engagement measure (e.g., a measure based on the quantity of that user's recent posts that include references such as links to other posts as compared to the total quantity of that user's posts), an activity measure (e.g., how frequently the user posts, such as an average number of posts per day), and an impact measure, (e.g., a quantification of the size of the users' social network of followers, friends, users, etc.), and a clout metric (e.g., representing the number of references and citations of the user's material in others' posts). Any one or more or any combination of the aforementioned reputation measures can be used to generate a reputation score.

Some embodiments of social profile data 306 include reputation measures, and/or, some embodiments of the social profile data 306 include demographic information about the person, including information about the person's income, age, profession, and geographic location. This profile data is useful for many purposes. For example, in some embodiments, a person having high reputation measure values, and/or, a person having a high number of followers may be targeted for outreach for the purposes of promoting job openings.

When analyzing internal social data, employee profile data may also be accessed as part of the analysis for the internal social network content. When the person is an employee there is additional profile information that may exist for the individual (e.g., organization information—who is the manager/employee, job function, job level, peer group, location, etc.). As noted above, external influences may be analyzed. Internal influences can similarly be analyzed, tracked, and/or leveraged using various data points, (e.g., based at least in part on job role, responsibility, title, number of employees managed by the person, and/or number of individuals in that person's organizational hierarchy).

The messages within the actionable social message store 312 can be processed using any suitable processing mechanism. In one embodiment, manual processing is performed through a user interface (UI) 314, whereby a user reviews the actionable social messages and manually takes action to direct the message to an appropriate destination (e.g., directing messages associated with a "product manager" position to appropriate personnel involved in the hiring of product managers). In an alternate embodiment, automated processing is performed using a rules and workflow engine 316. In this approach, a set of rules is provided in a rulebase, where the rules identify how the messages should be handled and directed within the organization. The rulebase can be constructed as a learning system, where feedback and a neural network algorithm are used to improve the handling of messages based upon looking at the results from past handling of messages.

The system then dispatches and/or creates the appropriate messages to be sent to destinations within the enterprise (e.g., social sourcing module 206, workforce reputation management module 208, etc.). The messages to these applications are dispatched based at least in part upon the tags that are associated with the data in the actionable social message store. When the other system takes action upon receiving the messages, then in some embodiments an update is provided in the actionable social message store 312 with the update status of the message.

In the semantic analysis, tagging and classification shown in FIG. 3 specific keywords are used in order to identify job seekers. A sample set of such keywords is given in the following FIG. 4A.

FIG. 4A is a diagram 4A00 showing characteristics of semantic filter keywords as used in systems for cross-referencing an employee database with social media connections to calculate job candidate reputation scores. As an option, one or more instances of diagram 4A00 or any aspect thereof may be implemented in the context of the architecture and functionality of the embodiments described herein. Also, the diagram 4A00 or any aspect thereof may be implemented in any desired environment.

FIG. 4A illustrates a semantic filter that may be used to identify job seekers in accordance with some embodiments, by filtering social network messages for keywords or phrases that indicate a desire to find a job (e.g., "need a job," "looking for a job," etc.). The filter may be based upon specific keywords, a keyword ID, strings, and/or combinations of words within a certain proximity (e.g., "searching for job" ~2, which returns a match if the words "searching," "for," and "job" are within two words of each other). In some embodiments, in addition to a "job seeker" filter, one or more filters may be created that correspond to specific job openings (e.g., a filter corresponding to a job opening in the engineering department, or a filter corresponding to human resources job opening).

Figure 4B:
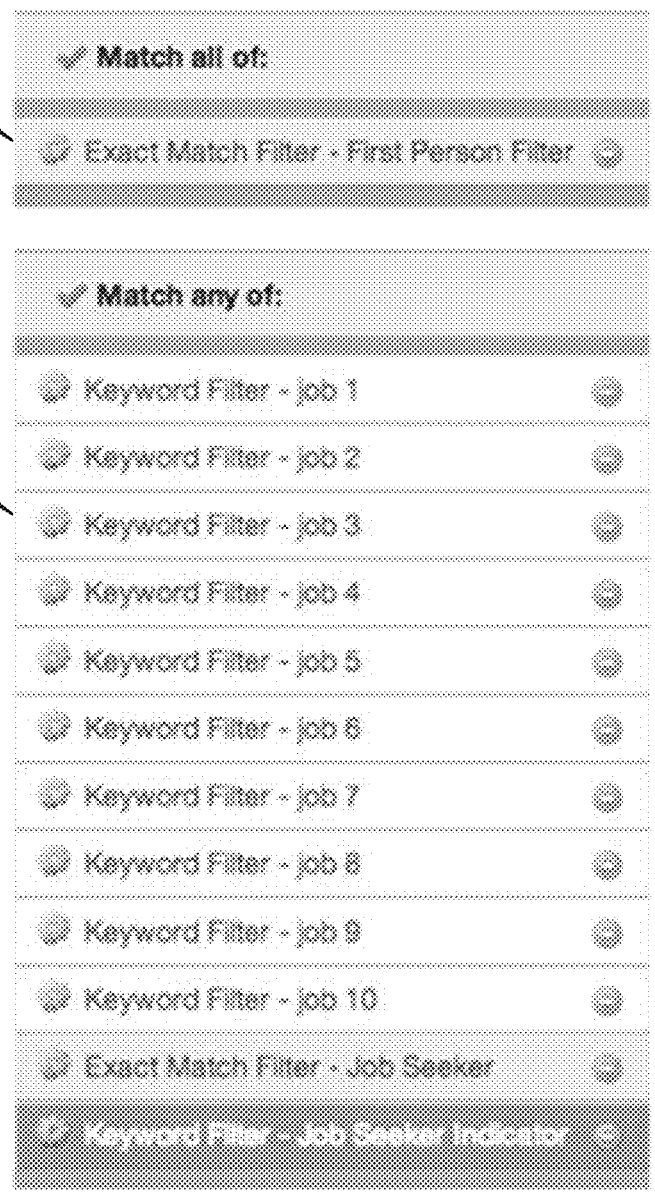
FIG. 4B depicts a dialog box to configure combinations of semantic filter keywords as used in systems for cross-referencing an employee database with social media connections to calculate job candidate reputation scores, according to an embodiment.

FIG. 4B depicts a dialog box 4B00 to configure combinations of semantic filter keywords as used in systems for cross-referencing an employee database with social media connections to calculate job candidate reputation scores. As an option, one or more instances of dialog box 4B00 or any aspect thereof may be implemented in the context of the architecture and functionality of the embodiments described herein. Also, the dialog box 4B00 or any aspect thereof may be implemented in any desired environment.

FIG. 4B illustrates a combination of filters that can be used to identify candidates for job openings in accordance with some embodiments (e.g., tagging social media messages as "active job seeker"). The combination of filters may comprise one or more necessary filters and one or more filter groups, wherein only a certain number of filters in the group need to be satisfied. For example, in order for a particular social media message or posting to be associated with an "active job seeker" tag, the message must satisfy a "first person filter", indicating that the message is about the author of the message. In addition, the message must satisfy at least one filter of filter group 404, which comprises a general "job seeker" filter and a plurality of filters corresponding to specific jobs.

In some embodiments, in addition or in the alternative to tagging content using filters, a vector based approach may be used. For example, each tag or topic may be associated with one or more semantic vectors (e.g., a "job seeker" tag is associated with a particular vector). When social media data is received, it may be converted into one or more semantic vectors through semantic analysis. The semantic vectors associated with the social media data is then compared to the semantic vectors associated with the tags. If a match of sufficient strength is found, the social media data is associated with the tag.

FIG. 4B illustrates a combination of filters 406 that can be used to identify candidates for job openings in accordance with some embodiments (e.g., tagging social media messages as "active job seeker"). The combination of filters may comprise one or more necessary filters, and one or more filter groups, wherein only a certain number of filters in the group need to be satisfied. For example, in order for a particular social media message or posting to be associated with an "active job seeker" tag, the message must satisfy the "first person filter", indicating that the message is about the author of the message. In addition, the message must satisfy at least one filter of filter group 404, which comprises a general "job seeker" filter and a plurality of filters corresponding to specific jobs.

In some embodiments, in addition to, or in the alternative to, tagging content using filters, a vector based approach may be used. For example, each tag or topic may be associated with one or more semantic vectors (e.g., a "job seeker" tag is associated with a particular vector). When social media data is received, it may be converted into one or more semantic vectors through semantic analysis. The semantic vectors associated with the social media data is then compared to the semantic vectors associated with the tags. If a match of sufficient strength is found, the social media data is associated with the tag.

Figure 5:
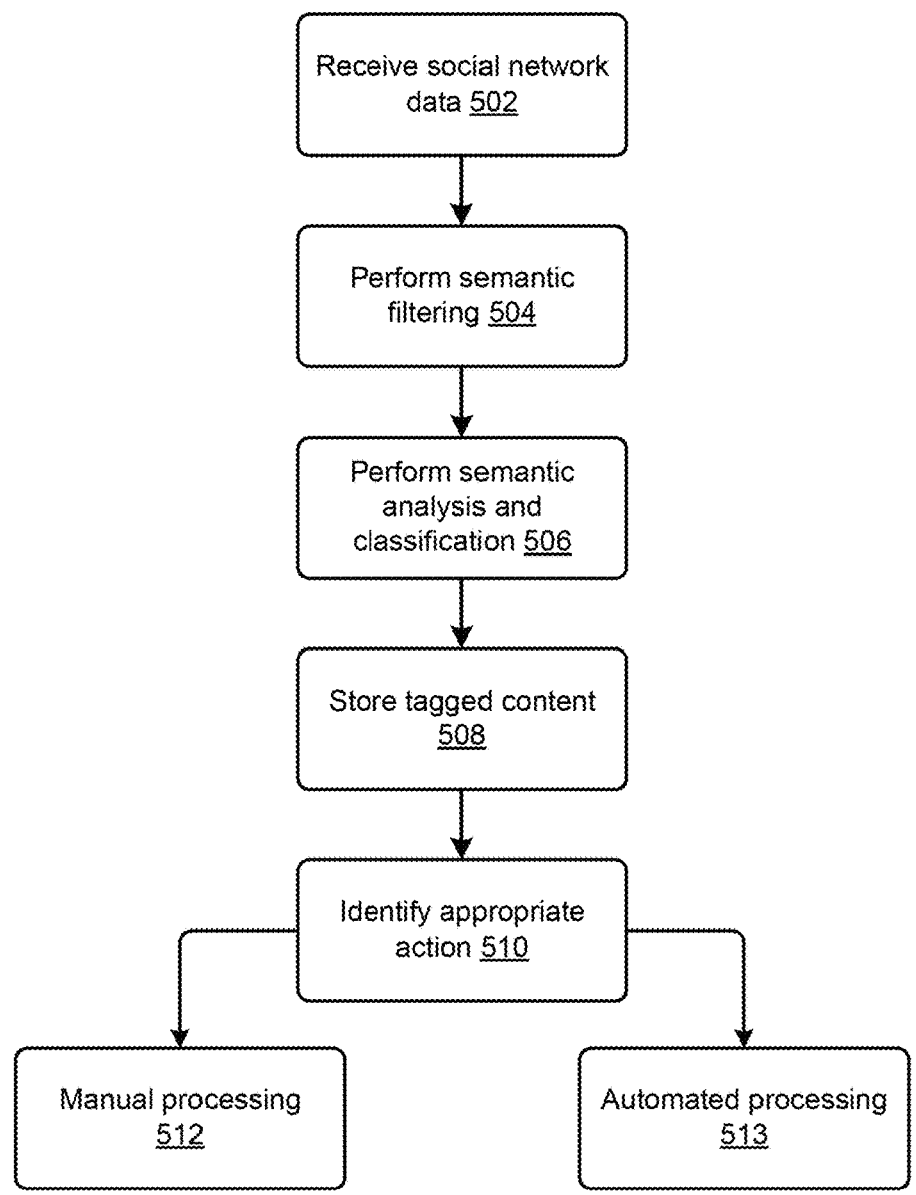
FIG. 5 is a flowchart of a process used in systems for cross-referencing an employee database with social media connections to calculate job candidate reputation scores, according to some embodiments.

FIG. 5 is a flowchart 500 of a process used in systems for cross-referencing an employee database with social media connections to calculate job candidate reputation scores. As an option, one or more instances of flowchart 500 or any aspect thereof may be implemented in the context of the architecture and functionality of the embodiments described herein. Also, the flowchart 500 or any aspect thereof may be implemented in any desired environment.

FIG. 5 illustrates a flowchart for identifying potential job seeker candidates through social media in accordance with some embodiments. At step 502, social network data is received. The data may be received from a plurality of social network sources, including public social network sites (e.g., Facebook, Twitter, LinkedIn, etc.) and/or private social network sites (e.g., a company's internal social network). The content may comprise any type of social media content, such as comments or postings, uploaded media, and/or likes/dislikes and endorsements.

At step 504, semantic filtering is performed on the social data. The filtering may be applied to some or all of the retrieved data. In some embodiments, different levels of filtering may be applied to different types and/or sources of data. For example, different levels of filtering may be applied depending on whether the social data is public social data or private social data.

At step 506, semantic analysis, tagging and classification is performed on the social media data. In some embodiments, this may comprise applying one or more preconfigured filters or combinations of filters on the social media data in order to identify and tag potential job seekers from the social media content. For example, a combination of filters as illustrated in FIG. 4B may be used to tag social media content as pertaining to "active job seekers".

At step 508, the tagged social media data may be stored in a data store. In addition, in some embodiments, tagged social media data originating from a common author may be identified and grouped together such that all tagged social media data for a particular job candidate may be quickly retrieved and analyzed together.

At step 510, tagged social media data may be retrieved, and identification is made as to an appropriate action to take with regards to the identified candidates. In some embodiments, this comprises retrieving individual pieces of tagged social media data. In other embodiments, all social media data associated with a particular candidate is retrieved. Possible actions may include manual actions 512 and/or automatic actions 513. If manual actions 512 are to be performed, the social media data and/or candidate profile associated with one or more pieces of social media data may be displayed to a user, and one or more controls provide allowing the user to manually take an action in response to the social media data. For example, candidate information may be forwarded to a particular department or personnel. A message may be composed and sent to the particular candidate. In addition, the candidate may be selected to undergo social sourcing at social sourcing module 206 or workforce reputation management module 208.

If an automatic action 513 is to be performed, a rules and workflow engine may be used comprising a set of rules provided in a rulebase. The rules identify how candidates should be handled and directed within the organization. For example, identified candidates may have different tags corresponding to one or more different job openings, and the action taken may be to forward candidate information to a particular department based upon the job opening(s) that the candidate is associated with. In addition, the candidate may be identified by the rules to undergo social sourcing at social sourcing module 206 or workforce reputation management module 208.

Social Sourcing

Social sourcing involves leveraging connections between candidates and other social network users (such as company employees) in order to access candidates and to promote new job openings to qualified candidates. For example, if a potential candidate for a job opening is connected through one or more social networks to one or more company employees, these connections may be analyzed to determine whether the employee would recommend or endorse the candidate for a particular job opening. In addition, employees may be able to use their social network connections to communicate information about job openings to qualified candidates that they are connected with.

Figure 6A:
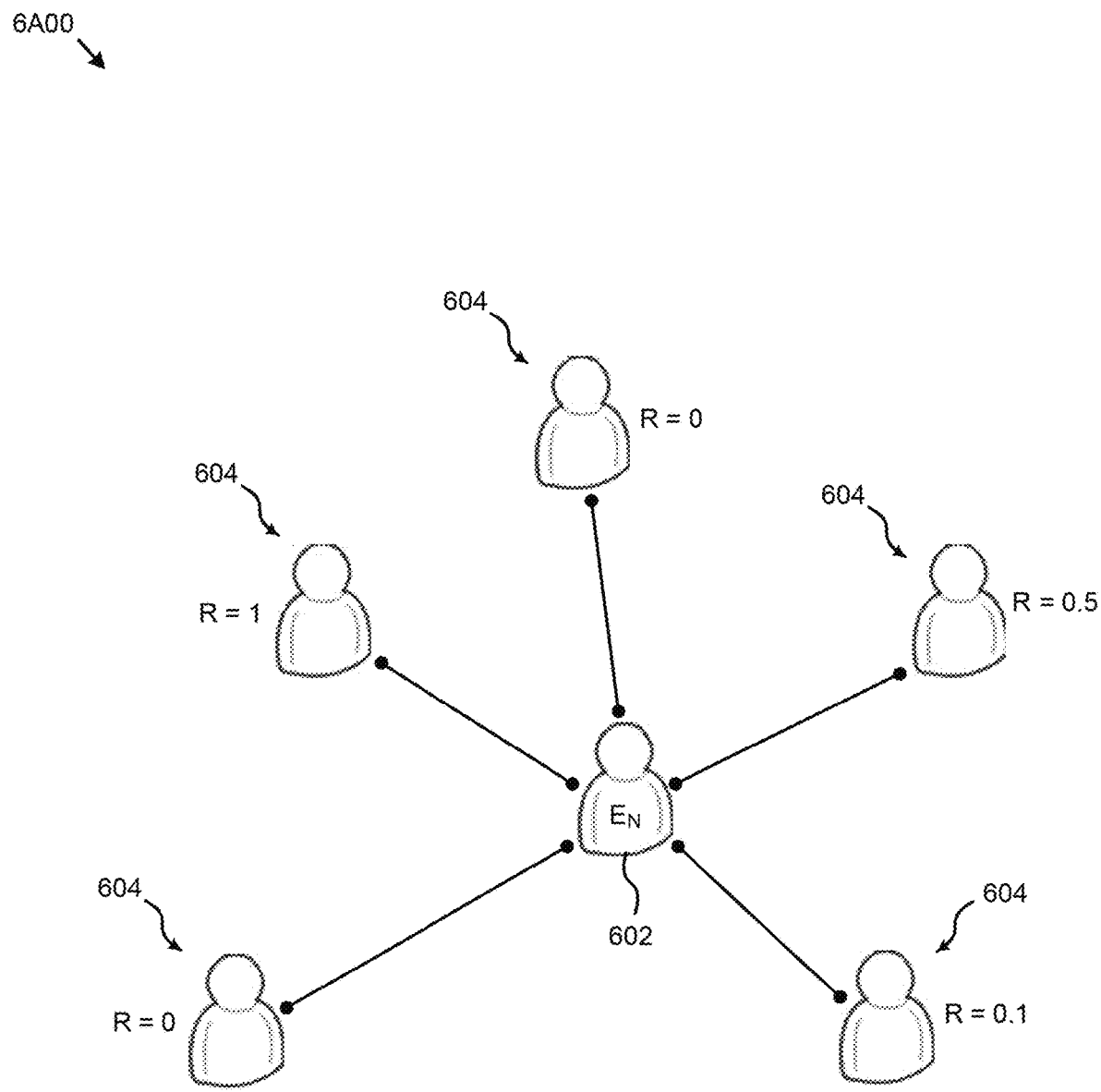
FIG. 6A illustrates a social connection chart as used in systems for cross-referencing an employee database with social media, according to some embodiments.

FIG. 6A illustrates a social connection graph 6A00 as used in systems for cross-referencing an employee database with social media. As an option, one or more instances of social connection graph 6A00 or any aspect thereof may be implemented in the context of the architecture and functionality of the embodiments described herein. Also, the social connection graph 6A00 or any aspect thereof may be implemented in any desired environment.

Social connection graph 6A00 may be used in order to identify social network connections between a social network user 602 and other social network users. For example, social network user 602 may be connected to a plurality of other users through a plurality of connections 605. In some embodiments, social network user 602 is an employee of the business (hereinafter referred to as "the employee").

In some embodiments, it is necessary for the employee to give permission to a manager or administrator to allow social sourcing module 206 to access his or her social network data. In other embodiments, at least some of the employee's social network data may be public and not require special permission to access. The social network data may include one or more profiles (e.g., a Facebook profile, a LinkedIn profile, a Twitter handle, etc.) from which connection information may be retrieved. Connection information may be determined from the accessed social network data, and include any type of social network connection between the employee and other users (hereinafter referred to as friends), such as a Facebook friend, a LinkedIn connection, or a Twitter follower. In some embodiments, social sourcing module creates a social connection graph 6A00 for each employee of the business that has given the necessary permissions.

Each connection between an employee and friend 604 may be associated with a referral or endorsement value (expressed in FIG. 6A as "R"). The referral value may be based upon any type of information or interaction that signifies an endorsement from the employee to a friend 604, and may be a passive endorsement or an overt endorsement. For example, one type of interaction (e.g., referrals, endorsements) may relate to an employee sharing a job opening with a friend 604, or an employee endorsing a friend 604 with a particular skill that is relevant to a job opening. In some embodiments, an endorsement may also be inferred from an employee being part of a common professional group or association with friend 604 on a social network. In some embodiments, a referral or endorsement may also be an actual endorsement by the employee to the company recommending a friend 604 for a particular job opening.

The referral value may be given a numerical value based upon the type of referral, the strength value of the referral, and/or characteristics of the particular job opening. For example, an explicit endorsement by the employee to the company recommending a friend 604 for a job opening may be given a higher referral value than employee endorsing a friend 604 with a particular skill on their social network page. Also, the employee endorsing a friend 604 with a skill that is core to a particular job opening may be given a higher referral value than endorsing friend with a skill that is related on a more ancillary level to the job opening. Referral values may be configured to fall within a certain range (e.g., a value between 0 and 1, wherein 0 corresponds to no available endorsement or referral information, while 1 corresponds to a high endorsement or referral). In some embodiments, referral values may be negative, which may signify that employee believes a friend 604 to be unsuited for a job. It is understood that while the above examples of how different types of endorsements may be weighted is given, in other embodiments various types of endorsements may be considered and weighted in different ways.

In some embodiments, if an employee has referred or endorsed a friend 604 through several different means (e.g., by endorsing a friend for a particular skill, or by sending a message to friend informing the friend of a job opening), a referral value may be calculated for each means, and aggregated to form a final referral value between the employee and a friend 604. In some embodiments, the final referral value may instead be the highest referral value among the multiple referral means.

Figure 6B:
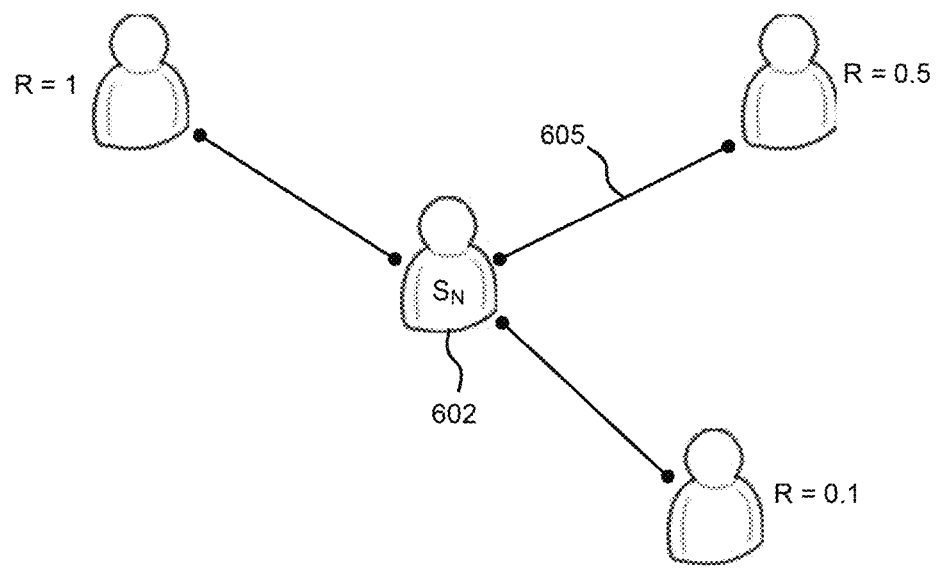
FIG. 6B illustrates a social referral graph as used in systems for cross-referencing an employee database with social media connections to calculate job candidate reputation scores, according to some embodiments.

FIG. 6B illustrates a social referral graph 6B00 as used in systems for cross-referencing an employee database with social media connections 605 to calculate job candidate reputation scores. As an option, one or more instances of social referral graph 6B00 or any aspect thereof may be implemented in the context of the architecture and functionality of the embodiments described herein. Also, the social referral graph 6B00 or any aspect thereof may be implemented in any desired environment.

Social referral graph 6B00 shows connections 605 of social network user 602 having a positive referral value. In other embodiments, social referral graph 6B00 may show all connections 605 of social network user 602 having a non-zero referral value.

When a potential candidate is identified, social sourcing module 206 may be used to find all social connection graphs which contain the candidate as a connection. The referral values to the candidate in the various social connection graphs may be used to calculate an aggregate referral value. In some embodiments, this may be done by simply calculating a sum to all referral values associated with the candidate. In some embodiments, each referral value may be given a weight based upon the employee that made the referral. The weight may be based upon employee performance, position, reputation, or any other relevant metric. For example, referrals from an employee having a position similar to a job opening for which the candidate is being considered may have more weight than from an employee having an unrelated position (e.g., a referral for a candidate for an engineering position may have more weight from an employee in the engineering department compared to an employee in the human resources department). The aggregate referral value may thus be a weighted in aggregation of the individual referral values. In other embodiments, the aggregate referral value may be calculated as an average, weighted average, or any other type of metric that may be used to obtain an aggregate referral value from one or more individual referral values.

In some embodiments, employees having connections 605 to the candidate but have not made any type of referral (e.g., R=0) may be prompted to provide a referral or endorsement. In some embodiments, this may be through an automated message that is sent to the employee requesting a referral of the candidate, while in other embodiments a list of candidates for which additional referral information is desired may be generated for review by an administrator, human resources manager, or other user, such that referral requests may be generated and sent manually.

In some embodiments, employees may be prompted to provide a referral value for a candidate based upon a current referral value and/or a number of connections 605 of the candidate. For example, if a candidate is connected to a number of employees, but none (or less than a threshold number or percentage) of the employees have provided any referral information concerning the candidate, then the employees to whom the candidate is connected may be prompted to provide referral information. Alternatively, if the number of referrals for the candidate exceeds a certain value (e.g., a predetermined value, or a value based upon a total number of connections), or the aggregate referral value of the candidate exceeds a certain value, then employees connected to the candidate who have not given any referral information may be prompted to provide referral information.

In some embodiments, if the aggregate referral value exceeds a certain value, outreach to the candidate may be initiated. For example, a recruiter or system user may be prompted to contact the candidate, or an automated message may be sent to the candidate urging them to apply for the job opening. In addition or in the alternative, other types of metrics may be used. For example, in one embodiment, outreach to a candidate may be initiated if the average referral value for a candidate exceeds a threshold, and the total number of positive referrals exceeds a threshold. In addition, if the candidate applies to the job opening, the aggregate referral value or other referral information may be considered while assessing the candidate in the application process.

Figure 7:
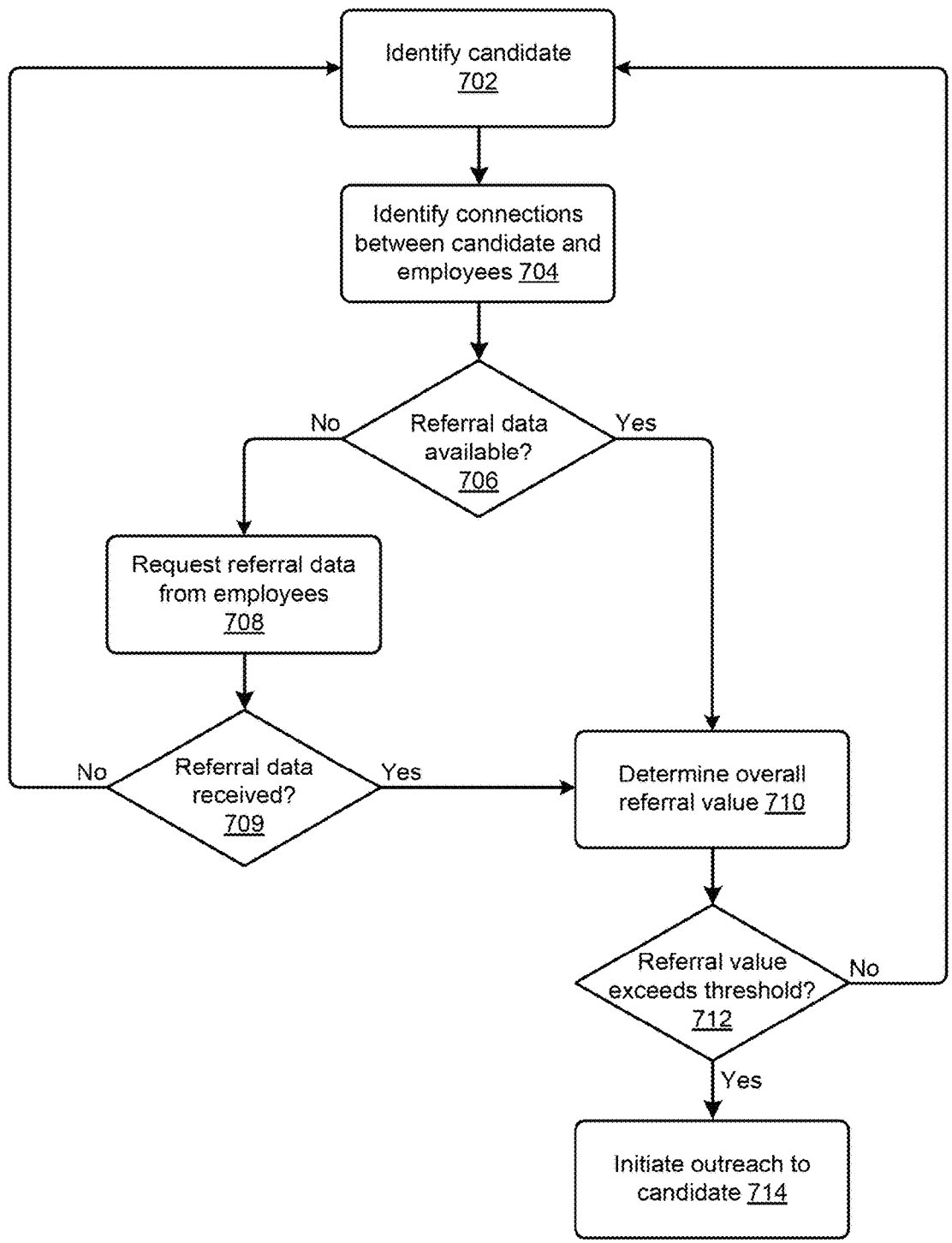
FIG. 7 illustrates a flowchart of a referral value determination process as used in systems for cross-referencing an employee database with social media connections to calculate job candidate reputation scores, according to some embodiments.

FIG. 7 illustrates a flowchart of a referral value determination process 700 as used in systems for cross-referencing an employee database with social media connections to calculate job candidate reputation scores. As an option, one or more instances of referral value determination process flowchart 700 or any aspect thereof may be implemented in the context of the architecture and functionality of the embodiments described herein. Also, the referral value determination process flowchart 700 or any aspect thereof may be implemented in any desired environment.

FIG. 7 illustrates a flowchart for a candidate social sourcing process in accordance with some embodiments. At step 702, a potential candidate for a job opening is identified. In some embodiments, this may be through a social engagement and monitoring module 204 that identifies potential candidates based upon the candidate's social network activity, as illustrated in FIG. 6A. In addition, in some embodiments, candidates may themselves elect to undergo the social sourcing process in order to provide more information to the company.

At step 704, connections between the identified candidates and employees of the business are identified. In some embodiments, this may comprise accessing a plurality of social connection graphs (e.g., as illustrated in FIG. 6A) created and stored by the social sourcing module. For example, a portion of the plurality of social connection graphs may contain connections between the candidate and employees of the business. In embodiments where a candidate has agreed to social sourcing, the candidate may provide his or her social network information, allowing the company to identify connections 605 to any company employees, and then retrieve the social connection graphs for those employees so that referral data can be identified.

At step 706, it is determined if referral data exists for the candidate's connections. In some embodiments, the referral data may be in the form of a numerical referral value for each of the candidate's connections (as illustrated in FIG. 6A and FIG. 6B).

At step 708, if it is determined that no referral data for the candidate exists, then employees who have connections to the candidate may be prompted to provide a referral value. In some embodiments, this may be in the form of an automated message to the employees. The message may be to all employees having a connection with the candidate, or only to a certain subset of employees. The subset of employees may be selected based upon employee position, type of connection to candidate, total number of employees connected to the candidate, or any other relevant criteria.

On the other hand, if referral data does exist (see operation 709), then at step 710 an overall referral value for the candidate may be calculated. In some embodiments, the overall referral value may be calculated by simply summing the individual referral values from the candidate's connection to company employees. In other embodiments, a weighted sum, average, or weighted average may be used, wherein the weights may be based upon employee performance or reputation, employee position relative to the job opening position, or any other relevant criteria.

Once an overall referral value has been calculated, then at step 712, a determination may be made as whether the overall referral value exceeds a certain threshold. In some embodiments, the threshold may be based upon a number of connections between the candidate and employees of the business, a number of individual referral values for the candidate, an average referral value, or any other relevant criteria.

At step 714, if it is determined that the overall referral value meets or exceeds the threshold value, then outreach to the candidate may be performed. For example, a recruiter or system user may be prompted to contact the candidate, or an automated message may be sent to the candidate urging them to apply to the job opening. In addition or in the alternative, other types of metrics may be used. For example, in one embodiment, outreach to a candidate may be initiated if the average referral value for a candidate exceeds a threshold, and the total number of positive referrals exceeds a threshold. In addition, if the candidate applies for the job opening, the aggregate referral value or other referral information may be considered while assessing the candidate in the application process.

In some embodiments, employees having connections to the candidate may also be prompted to provide the overall referral value for the candidate who does not reach a certain value, or if less than a certain percentage of the employees connected to the candidate have provided a referral value.

In some embodiments, connections between employees and potential candidates may be leveraged in order to promote job openings to qualified candidates. For example, job information may be provided to one or more employees who are prompted to share the job information with friends and/or friends of friends and/other connections that they believe are qualified for the job opening. The one or more employees may be chosen based upon job position, number of connections, or any other relevant factor or combination of relevant factors. For example, if a new job opening is an engineering position, then employees who are in the engineering department and/or have more than a certain number of social network connections may be given the job information to share with potential candidates they are connected to.

Workforce Reputation Management

In some embodiments, workforce reputation management module may be used to assess a "reputation" of an identified candidate using the candidate's associated social media information. In some embodiments, candidates identified through social engagement and monitoring module 204 may be referred to workforce reputation management module 208. In some embodiments, potential candidates can themselves opt to be processed through workforce reputation management module 208.

Figure 8A:
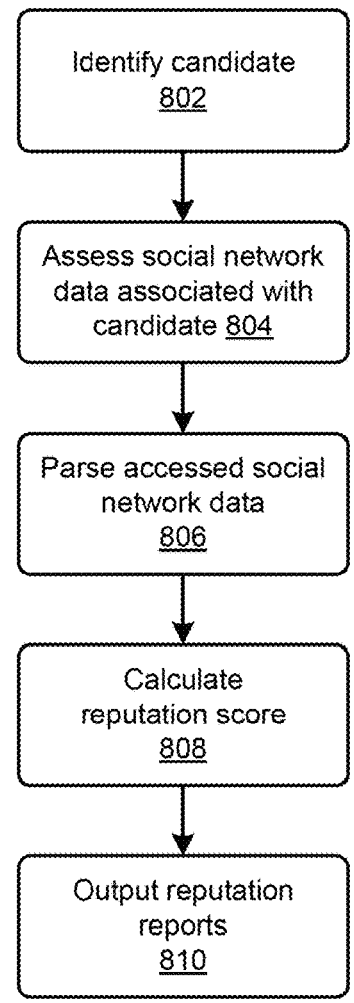
FIG. 8A illustrates a flowchart of a reputation assessment process as used in systems for implementing a social media recruiting application, according to an embodiment.

FIG. 8A illustrates a flowchart of a reputation assessment process 8A00 as used in systems for implementing a social media recruiting application. As an option, one or more instances of reputation assessment process 8A00 or any aspect thereof may be implemented in the context of the architecture and functionality of the embodiments described herein. Also, the reputation assessment process 8A00 or any aspect thereof may be implemented in any desired environment.

At step 802, a potential candidate is identified. The candidate may have been identified through social engagement and monitoring module 204, or may have been identified due to an election by a candidate to participate in the workforce reputation management process.

At step 804, social media data associated with the candidate is accessed. In some embodiments, this may be publically available social media data. In other embodiments, the candidate may give permission for workforce reputation management module 208 to access social media data that may not be publically available or require a login or authentication to view (e.g., certain data for a candidate on a candidate's social media profile page may only be viewed by users who are friends or are connected with the candidate).

At step 806, the accessed social media data for the candidate may be parsed and analyzed. In some embodiments, this may comprise semantically parsing the social media data in order to determine relevant information (e.g., candidate attributes). For example, in some social network sites, a candidate's profile page may contain a listing of the candidate's skill, work experience, interests, education, and/or other relevant information displayed in a format standard to the particular social media site. By parsing through the candidate's profile page, the relevant candidate attributes may be extracted and analyzed.

At step 808, the parsed information may be used to calculate a candidate's reputation. In some embodiments, this may comprise extracting attributes and assigning scores based upon the attributes (e.g., interests, skills, etc.), in order to determine an overall reputation metric. In other embodiments, the extracted attributes may be compared to current job openings (e.g., comparing the candidate's skills, interest, or experience with the requirements of the job opening) in order to determine how well the candidate matches up with the job opening requirements. In some embodiments, this may be done using a vector-based approach.

In some embodiments, if the candidate's reputation metric exceeds a certain threshold, outreach may be initiated. This may be done automatically, or a message may be sent to appropriate personnel identifying the candidate for further outreach. In some embodiments, the candidate's reputation information may be stored as part of a data store, allowing for a user to retrieve reputation information for identified candidates for reporting and analysis (e.g., see the step to output reputation reports 810), and for taking further action (e.g., initiating outreach to a top percentage of candidates).

Figure 8B:
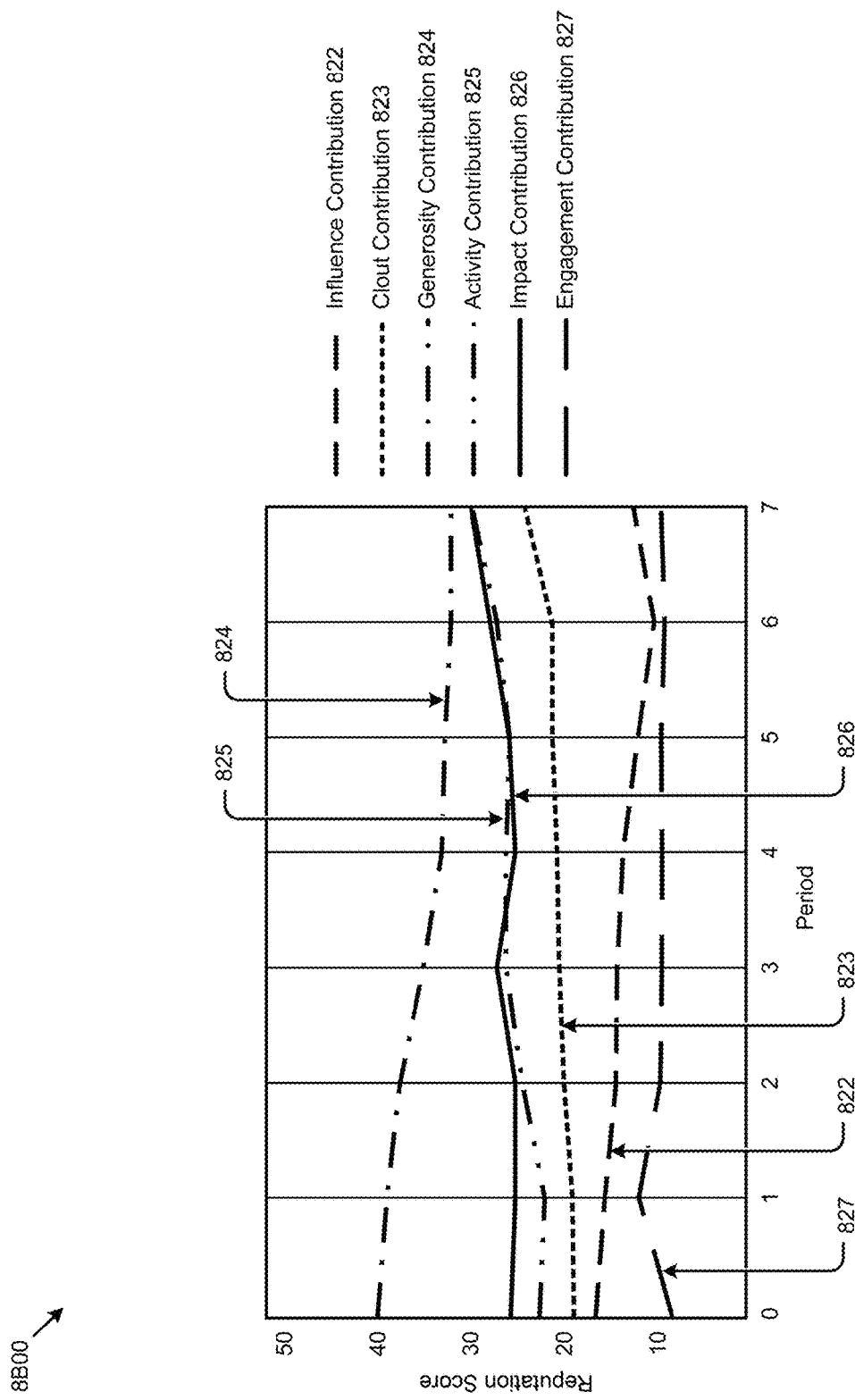
FIG. 8B depicts a reputation variation plot as used in systems for cross-referencing an employee database with social media connections to calculate job candidate reputation scores, according to an embodiment.

FIG. 8B depicts a reputation variation plot 8B00 as used in systems for cross-referencing an employee database with social media connections to calculate job candidate reputation scores. As an option, one or more instances of reputation variation plot 8B00 or any aspect thereof may be implemented in the context of the architecture and functionality of the embodiments described herein. Also, the reputation variation plot 8B00 or any aspect thereof may be implemented in any desired environment.

The shown plot depicts several contribution measures to a reputation score over several time periods. Any of the contribution measures (e.g., influence contribution 822, clout contribution 823, generosity contribution 824 activity contribution 825, impact contribution 826, or engagement contribution 827) or other contribution measures that may be present can be used to calculate an overall reputation score. Moreover, any time periods can be emphasized or de-emphasized when calculating an overall reputation score. Still more, any contributors to a reputation score that have been proffered by an employee can be emphasized (or de-emphasized).

ADDITIONAL EMBODIMENTS OF THE DISCLOSURE

Additional Practical Application Examples

Figure 9:
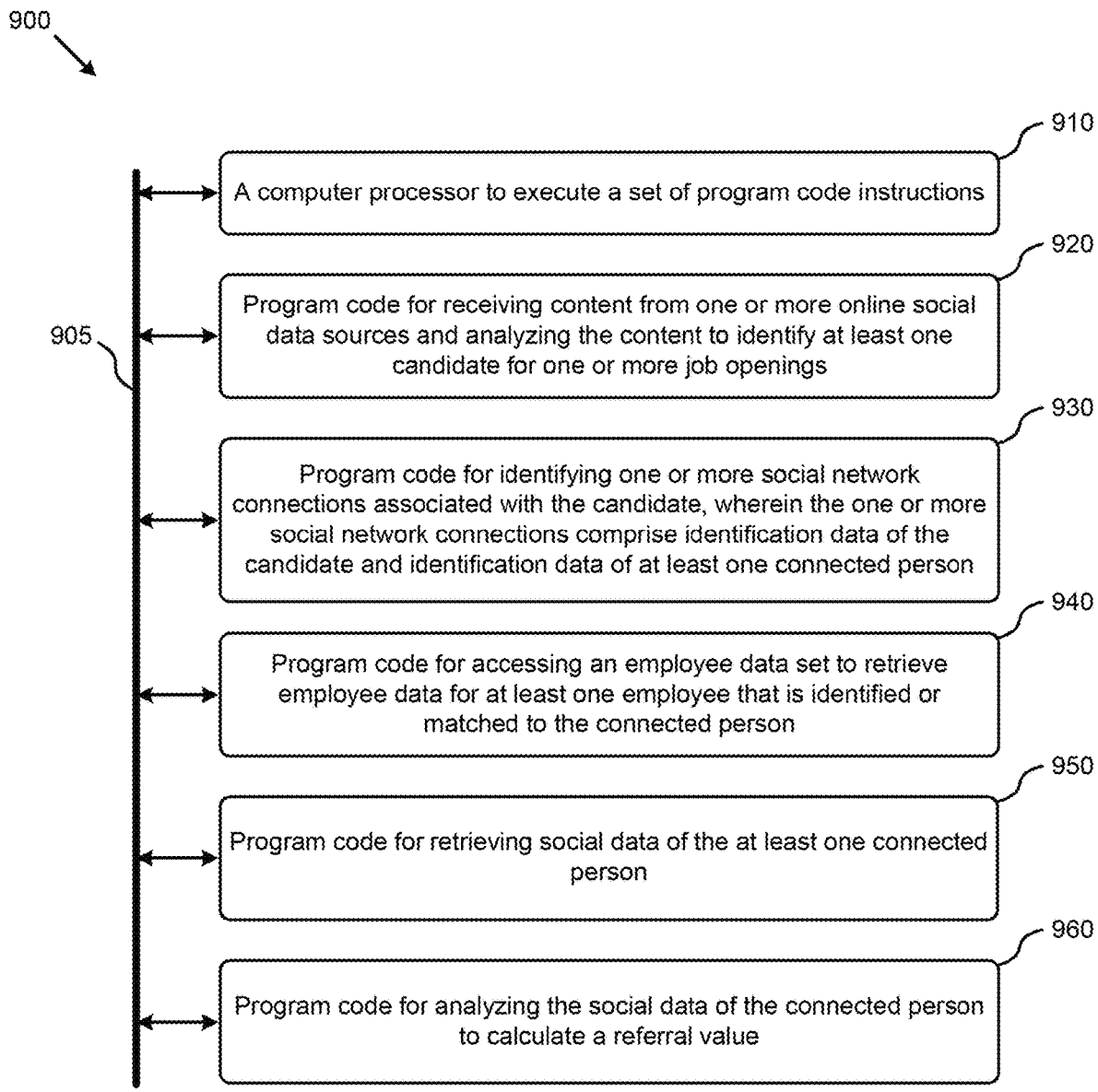
FIG. 9 depicts a system as an arrangement of computing modules that are interconnected so as to operate cooperatively to implement any of the herein-disclosed embodiments.

FIG. 9 depicts a system as an arrangement of computing modules that are interconnected so as to operate cooperatively to implement any of the herein-disclosed embodiments. The partitioning of 900 is merely illustrative and other partitions are possible. As an option, the present system 900 may be implemented in the context of the architecture and functionality of the embodiments described herein. Of course, however, the system 900 or any operation therein may be carried out in any desired environment. The system 900 comprises at least one processor and at least one memory, the memory serving to store program instructions corresponding to the operations of the system. As shown, an operation can be implemented in whole or in part using program instructions accessible by a module. The modules are connected to a communication path 905, and any operation can communicate with other operations over communication path 905. The modules of the system can, individually or in combination, perform method operations within system 900. Any operations performed within system 900 may be performed in any order unless as may be specified in the claims. The shown embodiment implements a portion of a computer system, presented as system 900, comprising a computer processor to execute a set of program code instructions (see module 910) and modules for accessing memory to hold program code instructions to perform: receiving content from one or more online social data sources and analyzing the content to identify at least one candidate for one or more job openings (see module 920); identifying one or more social network connections associated with the candidate, wherein the one or more social network connections comprise identification data of the candidate and identification data of at least one connected person (see module 930); accessing an employee data set to retrieve employee data for at least one employee that is identified or matched to the connected person (see module 940); retrieving social data of the at least one connected person (see module 950); and analyzing the social data of the connected person to calculate a referral value (see module 960).

System Architecture Overview

Additional System Architecture Examples

Figure 10A:
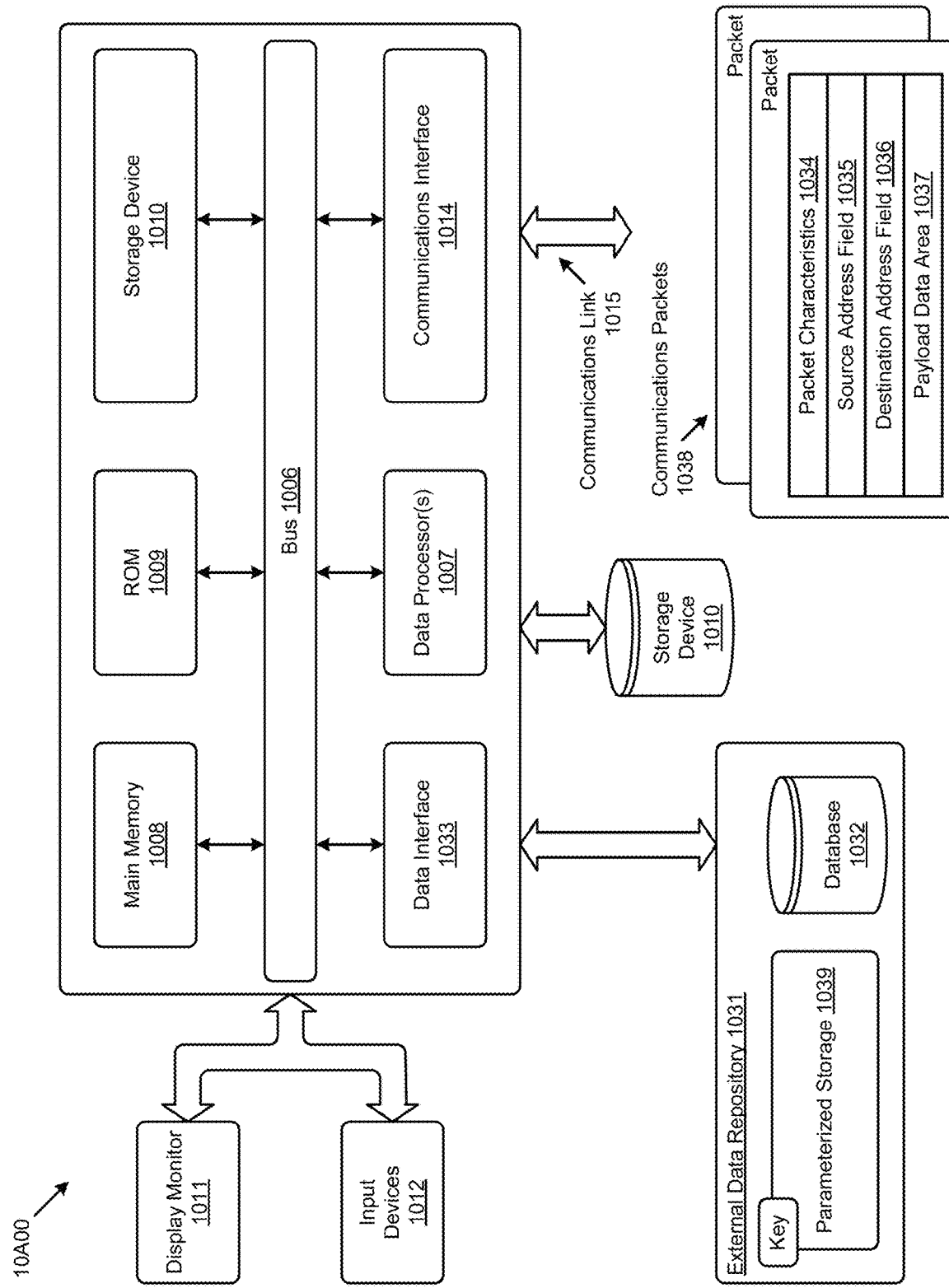
FIG. 10A, FIG. 10B, and FIG. 10C depict exemplary architectures of components suitable for implementing embodiments of the present disclosure, and/or for use in the herein-described environments.

FIG. 10A depicts a block diagram of an instance of a computer system 10A00 suitable for implementing embodiments of the present disclosure. Computer system 10A00 includes a bus 1006 or other communication mechanism for communicating information, which interconnects subsystems and devices such as a processor 1007, a system memory (e.g., main memory 1008, or an area of random access memory RAM), a static storage device (e.g., ROM 1009), an internal or external storage device 1010 (e.g., magnetic or optical), a data interface 1033, a communication interface 1014 (e.g., PHY, MAC, Ethernet interface, modem, etc.), a display 1011 (e.g., CRT or LCD), input devices 1012 (e.g., keyboard, cursor control), and an external data repository 1031.

According to an embodiment of the disclosure, computer system 10A00 performs specific operations by processor 1007 executing one or more sequences of one or more instructions contained in system memory. Such instructions may be read into system memory from another computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based or can be formed using a combination of hardware and software that implements logic, and/or can carry out computations and/or processing steps using one or more processes and/or one or more tasks and/or one or more threads or any combination therefrom.

According to an embodiment of the disclosure, computer system 10A00 performs specific networking operations using one or more instances of communication interface 1014. Instances of the communication interface 1014 may comprise one or more networking ports that are configurable (e.g., pertaining to speed, protocol, physical layer characteristics, media access characteristics, etc.) and any particular instance of the communication interface 1014 or port thereto can be configured differently from any other particular instance. Portions of a communication protocol can be carried out in whole or in part by any instance of the communication interface 1014, and data (e.g., packets, data structures, bit fields, etc.) can be positioned in storage locations within communication interface 1014, or within system memory, and such data can be accessed (e.g., using random access addressing, or using direct memory access DMA, etc.) by devices such as processor 1007.

The communications link 1015 can be configured to transmit (e.g., send, receive, signal, etc.) communications packets 1038 comprising any organization of data items. The data items can comprise a payload data area 1037, a destination address 1036 (e.g., a destination IP address), a source address 1035 (e.g., a source IP address), and can include various encodings or formatting of bit fields to populate the shown packet characteristics 1034. In some cases the packet characteristics include a version identifier, a packet or payload length, a traffic class, a flow label, etc. In some cases the payload data area 1037 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to processor 1007 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data. Such data can be stored, for example, in any form of external data repository 1031, which in turn can be formatted into any one or more storage areas, and which can comprise parameterized storage 1039 accessible by a key (e.g., filename, table name, block address, offset address, etc.).

In an embodiment of the disclosure, execution of the sequences of instructions to practice the disclosure is performed by a single instance of the computer system 10A00. According to certain embodiments of the disclosure, two or more instances of computer system 10A00 coupled by a communications link 1015 (e.g., LAN, PTSN, or wireless network) may perform the sequence of instructions required to practice embodiments of the disclosure using two or more instances of components of computer system 10A00.

The computer system 10A00 may transmit and receive messages, data, and instructions including programs (e.g., application code), through communications link 1015 and communication interface 1014. Received program code may be executed by processor 1007 as it is received and/or stored in the shown storage device or in or upon any other non-volatile storage for later execution. Computer system 10A00 may communicate through a data interface 1033 to a database 1032 on an external data repository 1031. Data items in a database can be accessed using a primary key (e.g., a relational database primary key). A module as used herein can be implemented using any mix of any portions of the system memory and any extent of hard-wired circuitry including hard-wired circuitry embodied as a processor 1007. Some embodiments include one or more special-purpose hardware components (e.g., power control, logic, sensors, transducers, etc.). A module may include one or more state machines and/or combinational logic used to implement or facilitate the operational or performance characteristics of cross-referencing an employee database with social media connections to calculate job candidate reputation scores.

Various implementations of the database 1032 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of cross-referencing an employee database with social media connections to calculate job candidate reputation scores). Such files or records can be brought into and/or stored in volatile or non-volatile memory.

Figure 10B:
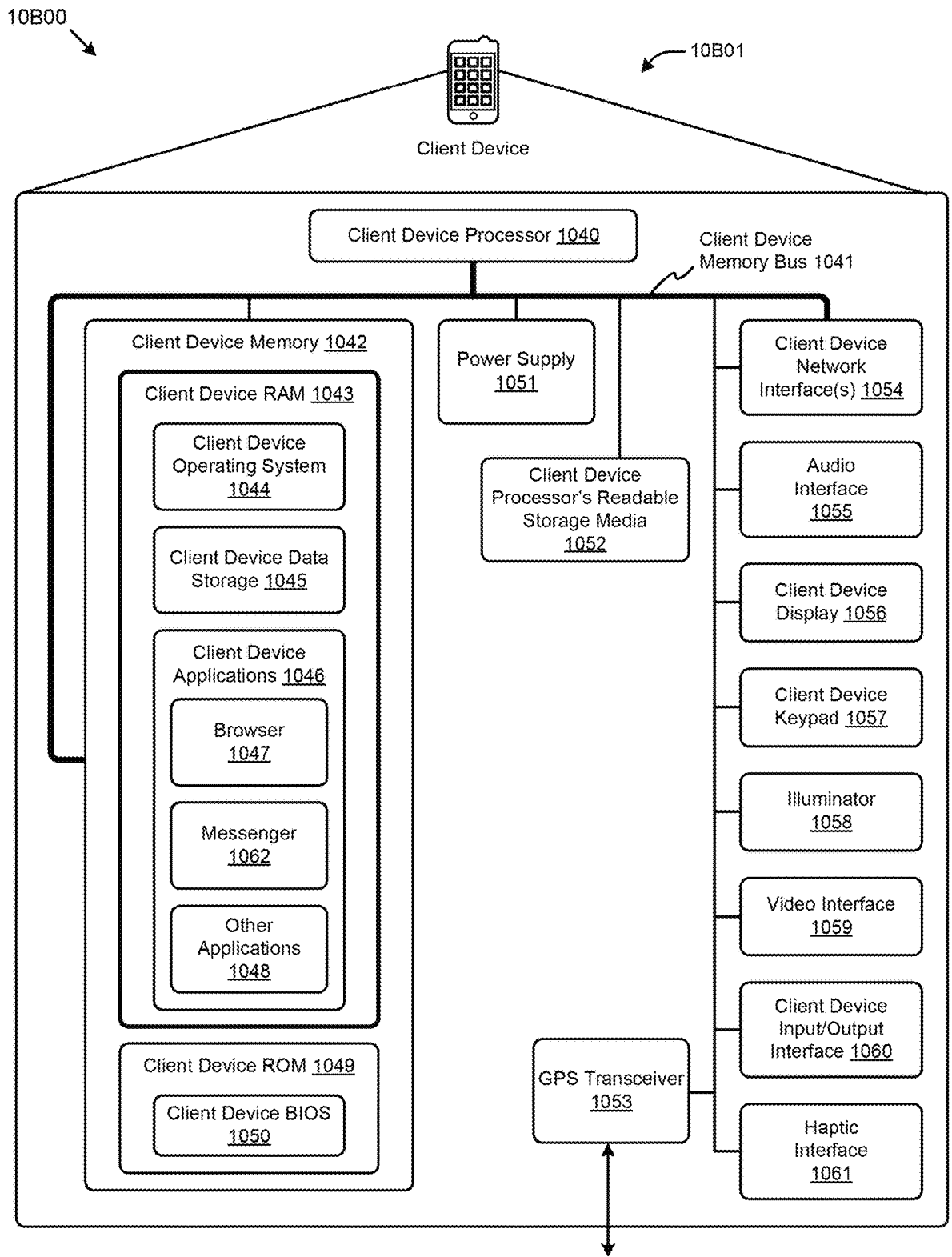

FIG. 10B depicts a block diagram 10B00 of an instance of a client device 10B01 that may be included in a system implementing instances of the herein-disclosed embodiments. Client device 10B01 may include many more or fewer components than those shown in FIG. 10B. Client device 10B01 may represent, for example, an embodiment of at least one of client devices as heretofore disclosed.

As shown in the figure, client device 10B01 includes a client device processor 1040 in communication with a client device memory 1042 via a client device memory bus 1041. Client device 10B01 also includes a power supply 1051, one or more client device network interfaces 1054, an audio interface 1055, a client device display 1056, a client device keypad 1057, an illuminator 1058, a video interface 1059, a client device IO interface 1060, a haptic interface 1061, and a GPS transceiver 1053 for global positioning services.

The power supply 1051 provides power to client device 10B01. A rechargeable or non-rechargeable battery may be used to provide power. The power may also be provided by an external power source such as an AC adapter or a powered docking cradle that supplements and/or recharges a battery.

A client device 10B01 may optionally communicate with a base station, or directly with another computing device. A client device network interface 1054 includes circuitry for coupling a client device 10B01 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless access protocol (WAP), ultra wide band (UWB), IEEE 802.16 Worldwide Interoperability for Microwave Access (WiMax), session initiated protocol/real-time transport protocol (SIP/RTP), or any of a variety of other wireless communication protocols. Client device network interface 1054 is sometimes known as a transceiver, a transceiving device, or a network interface card (NIC).

An audio interface 1055 is arranged to produce and receive audio signals such as the sound of a human voice. For example, audio interface 1055 may be coupled to a speaker and microphone to enable telecommunication with others and/or generate an audio acknowledgement for some action.

A client device display 1056 may be a liquid crystal display (LCD), gas plasma, light emitting diode (LED), or any other type of display used with a computing device. A client device display 1056 may also include a touch sensitive screen arranged to receive input from an object such as a stylus or a digit from a human hand.

A client device keypad 1057 may comprise any input device arranged to receive input from a user. For example, client device keypad 1057 may include a push button numeric dial, or a keyboard. A client device keypad 1057 may also include command buttons that are associated with selecting and sending images.

An illuminator 1058 may provide a status indication and/or provide light. Illuminator 1058 may remain active for specific periods of time or in response to events. For example, when the illuminator 1058 is active, it may backlight the buttons on client device keypad 1057 and stay on while the client device is powered. Also, the illuminator 1058 may backlight these buttons in various patterns when particular actions are performed such as dialing another client device. An illuminator 1058 may also cause light sources positioned within a transparent or translucent case of the client device to illuminate in response to actions.

A video interface 1059 is arranged to capture video images such as a still photo, a video segment, an infrared video or the like. For example, the video interface 1059 may be coupled to a digital video camera, a web-camera or the like. A video interface 1059 may comprise a lens, an image sensor, and other electronics. Image sensors may include a complementary metal-oxide-semiconductor (CMOS) integrated circuit, charge-coupled device (CCD), or any other integrated circuit for sensing light.

Some instances of the shown client device 10B01 comprise a client device IO interface 1060 for communicating with external devices such as a headset, or other input or output devices not shown in FIG. 10B. The client device IO interface 1060 can use one or more communication technologies such as a USB, infrared, Bluetooth™ port or the like. A haptic interface 1061 is arranged to as a human interface device (HID) to facilitate interaction with a user of a client device. Such interaction can include tactile feedback to a user of the client device. For example, the haptic interface 1061 may be employed to cause vibration of the client device 10B01 in a particular way (e.g., with a pattern or periodicity) and/or when interacting with one or another user.

A GPS transceiver 1053 can determine the physical coordinates of client device 10B01 on the surface of the Earth. The GPS transceiver 1053, in some embodiments, may be optional. The shown GPS transceiver 1053 outputs a location such as a latitude value and a longitude value. However, the GPS transceiver 1053 can also employ other geo-positioning mechanisms including, but not limited to, triangulation, assisted GPS (AGPS), enhanced observed time difference (E-OTD), cell identifier (CI), service area identifier (SAI), enhanced timing advance (ETA), base station subsystem (BSS) or the like, to determine the physical location of client device 10B01 on the surface of the Earth. It is understood that under different conditions, a GPS transceiver 1053 can determine a physical location within millimeters for client device 10B01; and in other cases, the determined physical location may be less precise such as within a meter or significantly greater distances. In certain embodiments, the client device 10B01 may provide other information that may be employed to determine a physical location of the device including, for example, a media access control (MAC) address, IP address, IP port identifier, or the like.

The client device memory 1042 includes random access memory 1043, read-only memory 1049, and other storage means. The client device memory 1042 illustrates an example of computer readable storage media (devices) for storage of information such as computer readable instructions, data structures, program modules or other data. The client device memory 1042 stores a basic IO system (BIOS) in the embodiment of client device BIOS 1050 for controlling low-level operation of client device 10B01. The memory also stores an operating system 1044 for controlling the operation of client device 10B01. It will be appreciated that this component may include a general-purpose operating system such as a version of UNIX, or LINUX™, or a specialized client communication operating system such as Microsoft Corporation's Windows Mobile™, Apple Corporation's iOS™ Google Corporation's Android™, or the Symbian® operating system. The operating system may include, or interface with a Java virtual machine module that enables control of hardware components and/or operating system operations via Java application programs.

The client device memory 1042 further includes one or more instances of client device data storage 1045, which can be used by client device 10B01 to store, among other things, client device applications 1046 and/or other data. For example, client device data storage 1045 may also be employed to store information that describes various capabilities of client device 10B01. The information may then be provided to another device based on any of a variety of events including being sent as part of a header during a communication, sent upon request or the like. Client device data storage 1045 may also be employed to store social networking information including address books, buddy lists, aliases, user profile information or the like. Further, client device data storage 1045 may also store messages, web page content, or any of a variety of content (e.g., received content, user generated content, etc.).

At least a portion of the information may also be stored on any component or network device including, but not limited, to a client device processor's readable storage media 1052, a disk drive or other computer readable storage devices within client device 10B01, etc.

An instance of a client device processor's readable storage media 1052 may include volatile, nonvolatile, removable, and non-removable media implemented in any method or technology for storage of information such as computer- or processor-readable instructions, data structures, program modules, or other data. Examples of computer readable storage media include RAM, ROM, electrically erasable programmable read-only memory (EEPROM), flash memory or other memory technology, Compact disc read-only memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. The aforementioned readable storage media 1052 may also be referred to herein as computer readable storage media.

The client device applications 1046 may include computer executable instructions which, when executed by client device 10B01, transmit, receive, and/or otherwise process network data. The network data may include, but is not limited to, messages (e.g., SMS, multimedia message service (MMS), instant message (IM), email, and/or other messages), audio, video, and enable telecommunication with another user of another client device. Client device applications 1046 may include, for example, a messenger 1062, a browser 1047, and other applications 1048. Certain other applications 1048 may include, but are not limited to, calendars, search programs, email clients, IM applications, SMS applications, voice over Internet protocol (VOIP) applications, contact managers, task managers, transcoders, database programs, word processing programs, security applications, spreadsheet programs, games, search programs, and so forth. In some embodiments, other applications 1048 may collect and store user data that may be received from other computing devices in the environment.

A messenger 1062 may be configured to manage a messaging session using any of a variety of messaging communications including, but not limited to email, SMS, IM, MMS, internet relay chat (IRC), Microsoft IRC (mIRC), really simple syndication (RSS) feeds, and/or the like. For example, in certain embodiments, the messenger 1062 may be configured as an IM application such as AOL (America Online) instant messenger, Yahoo! messenger, .NET messenger server, ICQ or the like. In certain embodiments, the messenger 1062 may be configured to include a mail user agent (MUA) such as Elm, Pine, message handling (MH), Outlook, Eudora, Mac Mail, Mozilla Thunderbird or the like. In another embodiment, the messenger 1062 may be a client device application that is configured to integrate and employ a variety of messaging protocols including, but not limited, to various push and/or pull mechanisms for client device 10B01. In certain embodiments, the messenger 1062 may interact with the browser 1047 for managing messages. As used herein, the term "message" refers to any of a variety of messaging formats, or communications form including, but not limited to, email, SMS, IM, MMS, IRC or the like.

A browser 1047 may include virtually any application configured to receive and display graphics, text, multimedia, messages and the like, employing virtually any web based language. In certain embodiments, the browser application is enabled to employ HDML, WML, WMLScript, JavaScript, SGML, HTML, XML and the like, to display and send a message. However, any of a variety of other web-based programming languages may be employed. In certain embodiments, a browser 1047 may enable a user of client device 10B01 to communicate with another network device as may be present in the environment.

Figure 10C:
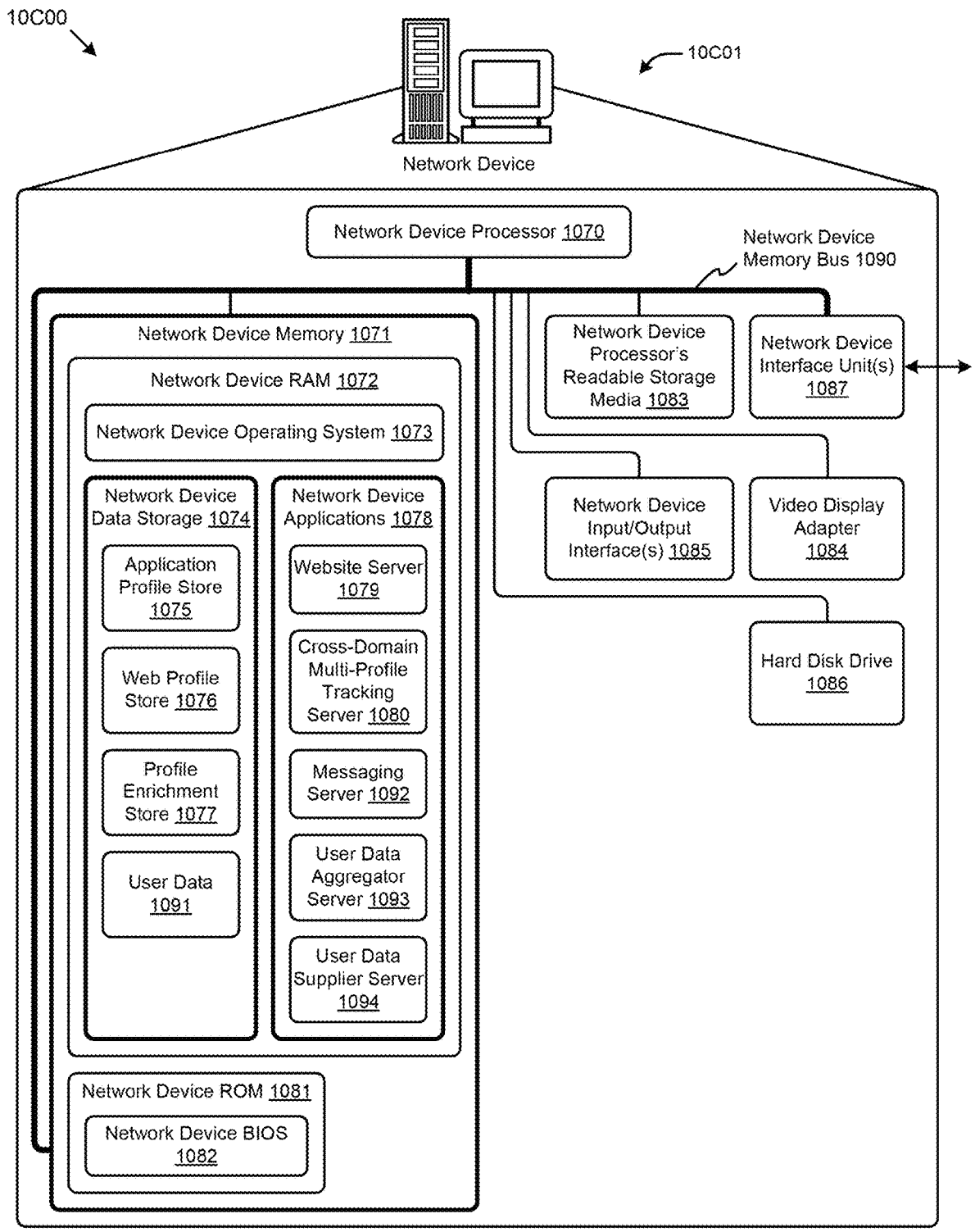

FIG. 10C depicts a block diagram 10000 of an instance of a network device 10001 that may be included in a system implementing instances of the herein-disclosed embodiments. Network device 10001 may include many more or fewer components than those shown. Network device 10001 may be configured to operate as a server, client, peer, a host, or any other device.

The network device 10001 includes at least one instance of a network device processor 1070, instances of readable storage media 1083, network interface(s) 1087, a network device IO interface 1085, a hard disk drive 1086, a video display adapter 1084, and a network device memory 1071, all in communication with each other via a network device memory bus 1090. The network device memory generally includes network device RAM 1072, network device ROM 1081. Some embodiments include one or more non-volatile mass storage devices such as a hard disk drive 1086, a tape drive, an optical drive, and/or a floppy disk drive. The network device memory stores a network device operating system 1073 for controlling the operation of network device

10001. Any general-purpose operating system may be employed. A basic input/output system (BIOS) is also provided in the form of network device BIOS 1082 for controlling the low-level operation of network device 10001. As illustrated in FIG. 10C, a network device 10001 also can communicate with the Internet, or some other communications network, via a network interface unit 1087, which is constructed for use with various communication protocols including the TCP/IP protocol. The network interface unit 1087 is sometimes known as a transceiver, a transceiving device, or a network interface card (NIC). Network device 10001 also comprises a network device IO interface 1085 for communicating with external devices such as a keyboard or other input or output devices. A network device IO interface 1085 can use one or more communication technologies such as USB, infrared, Bluetooth™ or the like.

The storage devices as described above may use various types of computer readable media, namely non-volatile computer readable storage media and/or a client device processor's instances of readable storage media 1083 and/or a network device processor's instances of readable storage media 1083. Such media may include any combinations of volatile, nonvolatile, removable, and non-removable media implemented in any method or technology for storage of information such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

As shown, network device data storage 1074 may include a database, text storage, a spreadsheet, a folder or directory hierarchy, a file or files or the like that may be configured to maintain and store user account identifiers, user profiles, email addresses, IM addresses, and/or other network addresses or the like. Network device data storage 1074 may further include program code, data, algorithms and the like, for use by a processor such as a network device processor 1070 to execute and perform actions. In certain embodiments, at least some of the logical contents of network device data storage 1074 might be stored on another component of network device 10001, such as on a second instance of hard disk drive 1086 or on an external/removable storage device.

The network device data storage 1074 may further store any portions of application data and/or user data such as an application profile store 1075, a web profile store 1076, a profile enrichment store 1077 and/or any user data collected. In some embodiments, user data 1091 may store unique user data, non-unique user data, aggregated user data, and/or any combination thereof. User data 1091 may include a variety of attributes such as a five digit zip code, an expanded nine digit zip code and the like.

The Network device data storage 1074 may also store program code and data. One or more network device applications 1078 may be loaded into network device data storage or any other mass memory, to be accessible to run with or as a part of network device operating system 1073. Examples of network device application programs may include transcoders, schedulers, calendars, database programs, word processing programs, hypertext transfer protocol (HTTP) programs, customizable user interface programs, IPSec applications, encryption programs, security programs, SMS message servers, IM message servers, email servers, account managers, and so forth. A messaging server 1092, website server 1079, user data aggregator server 1093, a cross-domain multi-profile tracking server 1080, and/or user data supplier server 1094 may also be included within or implemented as application programs.

A messaging server 1092 may include virtually any computing component or components configured and arranged to forward messages from message user agents and/or other message servers, or to deliver messages to a local message store such as network device data storage 1074 or the like. Thus, a messaging server 1092 may include a message transfer manager to communicate a message employing any of a variety of email protocols including, but not limited, to simple mail transfer protocol (SMTP), post office protocol (POP), Internet message access protocol (IMAP), network new transfer protocol (NNTP) or the like. A messaging server 1092 may also be managed by one or more components of the messaging server 1092. Thus, the messaging server 1092 may also be configured to manage SMS messages; IM, MMS, IRC, or RSS feeds; mIRC; or any of a variety of other message types. In certain embodiments, the messaging server 1092 may enable users to initiate and/or otherwise conduct chat sessions, VOIP sessions or the like.

A website server 1079 may represent any of a variety of information and services that are configured to provide content, including messages, over a network to another computing device. Thus, a website server 1079 can include, for example, a web server, a file transfer protocol (FTP) server, a database server, a content server or the like. A website server 1079 may provide the content including messages over the network using any of a variety of formats including, but not limited to WAP, HDML, WML, SGML, HTML, XML, compact HTML (cHTML), extensible HTML (xHTML) or the like. A website server 1079 may also be configured to enable a user of a client device to browse websites, upload user data, view and interact with advertisements or the like.

A user data aggregator server 1093 is configured to aggregate user data to be provided to user data buyers for advertising campaigns. In certain embodiments, a user data aggregator server 1093 may be configured to receive collected user data from a user data supplier server 1094. In some embodiments, a user data aggregator server 1093 may receive a query for user data. Based on the query, a user data aggregator server 1093 may generate a plurality of subsets of aggregated user data. In some embodiments, user data aggregator server 1093 may be included in a network device.

A user data supplier server 1094 is configured to collect user data. In certain embodiments, the user data supplier server 1094 may be configured to provide the collected user data to user data aggregator server 1093. In some embodiments, the user data supplier server 1094 may collect and/or provide unique user data and/or non-unique user data. In certain embodiments, the user data supplier server 1094 may aggregate the collected user data. In some embodiments, the user data supplier server 1094 may be included in any computing device such as heretofore described.

Returning to discussion of the heretofore introduced environments, the environments includes components with which various systems can be implemented. Not all of the components shown may be required to practice the embodiments, and variations in the arrangement and type of the components may be made without departing from the spirit or scope of the disclosure.

Various environment in which embodiments of the disclosure operate may include local area networks (LANs)/ wide area networks (WANs), wireless networks, client devices (e.g., user stations). The overall network, including any sub-networks and/or wireless networks, are in communication with, and enables communication between components in the environment.

Instances of client devices may include virtually any computing device capable of communicating over a network to send and receive information, including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In certain embodiments, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In certain embodiments, a user of the client device may employ the browser application to perform various activities over a network (online). However, another application may also be used to perform various online activities.

Client devices may include at least one client application that is configured to receive and/or send data between another computing device (e.g., a server component). The client application may include a capability to provide send and/or receive content or the like. The client application may further provide information that identifies itself including a type, capability, name or the like. In certain embodiments, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In certain embodiments, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between another computing device and/or between other networks.

Any of the foregoing networks can be configured to couple network devices with other computing devices and communication can include communicating between the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communication links within LANs may include twisted wire pair or coaxial cable, while communication links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communication links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices can be remotely connected to either LANs or WANs via a modem and temporary telephone link. In various embodiments, a network may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method, comprising:
identifying social data at one or more modules that are stored in memory, and the one or more modules comprise a social media application and an enterprise application, wherein the social data comprises public social network data that is retrieved by the social media application from one or more social media systems on one or more first servers via an external network component and further comprises non-public data that is retrieved by the enterprise application via an internal network component from one or more databases in a private network, wherein identifying the social data comprises:
   analyzing the public social network data from the one or more social media systems to identify a plurality of users, wherein the plurality of users represents candidates for one or more job openings;
   identifying one or more social network connections associated with the plurality of users, wherein the one or more social network connections comprise identification data of the plurality of users and at least one connected user;
   retrieving, from a data set in the one or more databases by the enterprise application, the non-public data for the at least one connected user, wherein the non-public data comprises employee data and is inaccessible from outside the private network; and
   retrieving, from the one or more social media systems by the social media application, the public social network data of the at least one connected user;
storing respective identification information of the candidates in a first sub-structure of a social profile data structure and one or more respective quantifiable reputation measures for the candidates in a second sub-structure of the social profile data structure, wherein the one or more quantifiable measures respectively correspond to the respective identification information of the candidates;
determining respective referral values for the plurality of users at least by processing the social data, processing the social data comprising:
   performing a multi-stage filtering on the social data, wherein performing the multi-stage filtering comprises:
      receiving one or more inputs for a multi-stage filtering module that comprises a first stage filtering module and a second stage filtering module, wherein
         the first stage filter module corresponds to a first filtering level and comprises at least one filter, and the second stage filtering module corresponds to a second filtering level and comprises multiple filters,
         the first and the second filtering levels are respectively determined based at least in part upon respective sources of data for the first stage and the second stage filtering modules, and
         the second filtering level is greater than the first filtering level;
      identifying a data type for the social data, wherein the data type comprises a first type and a second type, the first type corresponding to the non-public data from the one or more databases in the private network, and the second type corresponding to public social network data from the one or more social media systems; and
      in response to the one or more inputs and the data type that has been identified, reducing an amount of data received at an enterprise server for cross-referencing the non-public data with the public social network data at least by:
         for the non-public data having the first type and retrieved from the private network, executing the first stage filtering module with the first filtering level on at least some non-public data in the non-public data to generated reduced non-public data, wherein the first filtering level applied to the non-public data is smaller than the second filtering level, and
         for the public social network data having the second type and retrieved from the one or more social media systems external to the private network,
         executing the second filtering module that applies a first filter of the multiple filters in the second stage filtering module on at least some of the public social network data to generate first reduced public social network data; and
         executing the second filtering module that applies a second filter of the multiple filters to the first reduced public social network data to further reduce the first reduced public social network data into reduced public social network data, wherein second filtering level applied to the public social network data is greater than the first filtering level applied to the non-public data;
   identifying corresponding respective quantifiable reputation measures for the plurality of users from the second sub-structure of the social profile data structure based at least in part upon the identification information of the plurality of users in the first sub-structure of the social profile data structure;
   determining the respective referral values for the plurality of users based at least in part upon the corresponding respective quantifiable reputation measures for the plurality of users;
cross-referencing, by at least one of the one or more modules, the reduced non-public data with the reduced public social network data at least by associating the respective referral values with the one or more social network connections for the plurality of users based at least in part upon the corresponding respective quantifiable reputation measures, the reduced non-public data, and the reduced public social network data;

forwarding, by a messaging server, a plurality of electronic messages pertaining to the plurality of users at least by:

generating, by the messaging server, the plurality of electronic messages pertaining to at least the reduced public social network data; and routing and presenting the plurality of electronic messages to a plurality of destination computing devices based at least in part upon a plurality of tags associated with respective clusters of the public social network data.

2. The method of claim 1, further comprising:

forming a reputation score;

generating a reputation variation graph structure comprising a plurality of contribution measures and a plurality of time periods based at least in part upon the reduced non-public data and the reduced public social network data;

determining a reputation score for the candidate of the candidates by using at least the reputation variation graph structure; and assessing how the candidate matches up to at least one of the one or more job openings based at least in part upon the reputation score.

3. The method of claim 2, storing respective information and one or more respective quantifiable measures for the candidate comprising:

determining a first quantifiable reputation measure that indicates generosity of a candidate based at least in part upon a first frequency of the candidate responding to social network posts of one or more other people on the one or more social media systems;

determining a second quantifiable reputation measure that indicates influence of the candidate based at least in part upon a second frequency of reposting a post of the candidate on the one or more social media systems;

determining a third quantifiable reputation measure that indicates engagement of the candidate based at least in part upon a ratio between a quantify of posts that include one or more references to one or more other posts by the candidate and a total number of posts by the candidate;

determining a fourth quantifiable reputation measure that indicates activity level of the candidate based at least in part upon a third frequency that the candidate posts one or more posts on the one or more social media systems;

determining a fifth quantifiable reputation measure that indicates impact of the candidate based at least in part upon quantification of a size of followers of the candidate on the one or more social media systems;

determining a sixth quantifiable reputation measure that indicates clout of the candidate based at least in part upon a number of citations of contents of the candidate in one or more other posts by one or more other candidates in the one or more social media systems; and storing the respective identification information of the candidate and two or more quantifiable reputation measures in one or more respective fields in the second sub-structure in the social profile data structure for the candidate, wherein the two or more quantifiable reputation measures include at least one of the first quantifiable measure, the second quantifiable measure, the third quantifiable measure, the fourth quantifiable measure, the fifth quantifiable measure, or the six quantifiable measure, and the reputation score is determined based at least in part upon at least one of the one or more quantifiable reputation measures.

4. The method of claim 2, wherein the public social network data from the one or more social media systems comprises a post on Facebook, and the one or more social network connections are identified using at least one or more social connection graphs comprising at least friends and friends of friends, and wherein forming the reputation score comprises performing a semantic analysis over the content from the one or more social media systems.

5. The method of claim 1, further comprising reducing mis-categorization of the social data at least by performing a semantic analysis on the social data to remove noise or irrelevant data, wherein, only the public social network data but not the non-public data is subject to semantic filtering that reduces excess noise or irrelevant data, and a referral value of the respective referral values is determined based at least in part upon at least one of a type of interaction between an employee and a candidate of the candidates, or a type of referral, or a strength value, or a characteristic of a job opening of the one or more job openings, or any combination thereof.

6. The method of claim 1, performing a multi-stage filtering on the social data further comprising:

for the public social network data, reducing mis-categorization of the public social network data at least by executing the second filtering module that applies the first filter on the public social network data with the second filtering level, wherein the first filter comprises a semantic filter; and for the non-public data, executing the first filtering module that applies the semantic filter on the non-public data with the first filtering level, wherein the first filtering intensity is stronger than the second filtering strength.

7. The method of claim 1, further comprising initiating outreach at least by sending an automated electronic messages to an candidate of the candidates when a referral value of the respective referral values exceeds a predetermined threshold, wherein a referral value of the respective referral values is determined based at least in part upon a type of interaction between an employee and the at least one connected user.

8. The method of claim 1, further comprising:

associating one or more rich-content tags with the public social network data based at least in part upon one or more social network connections and social network activities identified from the public social network data, associating the one or more rich-content tags with the public social network data comprising at least:

associating a rich-content tag of the one or more rich-content tags with one or more semantic vectors;

converting content data in the public social network data into a sematic vector at least by performing a semantic analysis;

comparing the semantic vector for the content data to the one or more semantic vectors associated with the rich-content tag; and associating the content data with the rich-content tag based at least in part upon a comparison result of comparing the semantic vector for the content data to the one or more semantic vectors;

grouping the public social network data, which has been associated with the one or more rich-content tags, into a group for a candidate of the candidates;
identifying the plurality of users representing the candidates based at least in part upon the one or more rich-content tags;
monitoring the social network activities of the plurality of users; and
identifying a connection between a candidate of the candidates and a user identified from the non-public data, wherein at least one of the one or more social media systems includes thereupon at least one of a social network post, or a blog, or a web feed, or any combination thereof.

9. The method of claim 8, wherein analyzing the public social network data from the one or more social media systems comprises performing a semantic analysis on at least one of the social network post, or the blog, or the web feed, or any combination thereof; and the method further comprising:
determining a referral value for a social network connection of the one or more social network connections based at least in part upon information that indicates endorsement for a candidate of the candidates, wherein the information comprises a type of interaction between the social network connection and the candidate, a type of referral by the social network connection for the candidate, a strength of the referral, or a characteristic of the one or more job openings,
the type of referral includes an explicit endorsement, a passive endorsement, an overt endorsement, and an inferred endorsement, and
the referral value has a range from a negative value to a positive value;
determining whether the at least one connection provides respective referrals for the candidate through multiple means; and
when it is determined that the at least one connection provides the respective referrals for the candidate through multiple means, determining the referral value at least by aggregating respective referral values of the respective referrals, wherein the respective referrals are weighted by one or more weights that are determined based at least in part upon similarity of a first job of the at least one connection and the one or more openings.

10. The method of claim 9, further comprising:
determining a combination of filters that comprises one or more necessary filters and one or more filter groups for the second stage filtering module, wherein
only a certain number of filters in a group of the one or more filter groups needs to be satisfied by the public social network data, and
the first reduced public social network data or the reduced public social network data is required to satisfy at least one filter group of the one or more filter groups; and
determining a general filter and multiple specific filters for at least one filter group for the second stage filtering module.

11. A computer program product, embodied in a non-transitory computer readable medium having stored thereon a sequence of instructions which, when stored in memory and executed by a processor, causes the processor to perform a set of acts, the set of acts comprising:
Identifying social data at one or more modules that are stored in memory, and the one or more modules comprise a social media application and an enterprise application, wherein the social data comprises public social network data that is retrieved by the social media application from one or more social media systems on one or more first servers via an external network component and further comprises non-public data that is retrieved by the enterprise application via an internal network component from one or more databases in a private network wherein identifying the social data comprises:
analyzing the public social network data from the one or more social media systems to identify a plurality of users, wherein the plurality of users represents candidates for one or more job openings;
identifying one or more social network connections associated with the at least one user, wherein the one or more social network connections comprise identification data of the at least one user and at least one connected user;
retrieving, from a data set in the one or more databases by the enterprise application, the non-public data for the at least one connected user, wherein the non-public data comprises employee data and is inaccessible from outside the private network; and
retrieving, from the one or more social media systems by the social media application, the public social network data of the at least one connected user;
storing respective identification information of the candidates in a first sub-structure of a social profile data structure and one or more respective quantifiable reputation measures for the candidates in a second sub-structure of the social profile data structure, wherein the one or more quantifiable measures respectively correspond to the respective identification information of the candidates;
determining respective referral values for the plurality of users at least by processing the social, processing the social data comprising:
performing a multi-stage filtering on the social data, wherein performing the multi-stage filtering comprises:
receiving one or more inputs for a multi-stage filtering module that comprises a first stage filtering module and a second stage filtering module, wherein
the first stage filtering module corresponds to a first filtering level and comprises at least one filter, the second stage filtering module corresponds to a second filtering level and comprises multiple filters,
the first and the second filtering levels are respectively determined based at least in part upon respective sources of data for the first stage and the second stage filtering modules,
the second filtering level is greater than the first filtering level, and
the one or more inputs are received at a user interface via an input device;
identifying a data type for the social data, wherein the data type comprises a first type and a second type, the first type corresponding to the non-public data from the one or more databases in the private network, and the second type corresponding to public social network data from the one or more social media systems; and
in response to the one or more inputs and the data type that has been identified, reducing an amount of data received at an enterprise server for cross-referencing the non-public data with the public social network at least by:
for the non-public data having the first type and retrieved from the private network, executing the first stage filtering module with the first filtering level on at least some non-public data of the non-public data to generated reduced non-public data, wherein the first filtering level applied to the non-public data is smaller than the second filtering level, and
for the public social network data having the second type and retrieved from the one or more social media systems external to the private network,
executing the second filtering module that applies a first filter of the multiple filters in the second stage filtering module on at least some of the public social network data of the public social network data to generate first reduced public social network data; and
executing the second filtering module that applies a second filter of the multiple filters to the first reduced public social network data to further reduce the first reduced public social network data into reduced public social network data, wherein second filtering level applied to the public social network data is greater than the first filtering level applied to the non-public data;
identifying corresponding respective quantifiable reputation measures for the plurality of users from the second sub-structure of the social profile data structure based at least in part upon the identification information of the plurality of users in the first sub-structure of the social profile data structure;
determining the respective referral values for the plurality of users based at least in part upon the corresponding respective quantifiable reputation measures for the plurality of users;
cross-referencing, by at least one of the one or more modules, the reduced non-public data with the reduced public social network data at least by associating the respective referral values with the one or more social network connections for the plurality of users based at least in part upon the corresponding respective quantifiable reputation measures, the reduced no-public data, and the reduced public social network data; and
forwarding, by a messaging server, a plurality of electronic messages pertaining to the plurality of users at least by:
generating, by the messaging server, the plurality of electronic messages pertaining to at least the reduced public social network data; and
routing and presenting the plurality of electronic messages to a plurality of destination computing devices based at least in part upon a plurality of tags associated with respective clusters of the public social network data.

12. The computer program product of claim 11, further comprising instructions which, when stored in the memory and executed by the processor, cause the processor to perform the set of acts, the set of acts further comprising:
forming a reputation score;
generating a reputation variation graph structure comprising a plurality of contribution measures and a plurality of time periods based at least in part upon the reduced non-public data and the reduced public social network data; and
determining a reputation score for a candidate of the candidates by using at least the reputation variation graph structure, wherein only the public social network data but not the non-public data is subject to semantic filtering that reduces excess noise or irrelevant data.

13. The computer program product of claim 12, storing respective information and one or more respective quantifiable measures for the candidate comprising:
determining a first quantifiable reputation measure that indicates generosity of a candidate based at least in part upon a first frequency of the candidate responding to social network posts of one or more other people on the one or more social media systems;
determining a second quantifiable reputation measure that indicates influence of the candidate based at least in part upon a second frequency of reposting a post of the candidate on the one or more social media systems;
determining a third quantifiable reputation measure that indicates engagement of the candidate based at least in part upon a ratio between a quantify of posts that include one or more references to one or more other posts by the candidate and a total number of posts by the candidate;
determining a fourth quantifiable reputation measure that indicates activity level of the candidate based at least in part upon a third frequency that the candidate posts one or more posts on the one or more social media systems;
determining a fifth quantifiable reputation measure that indicates impact of the candidate based at least in part upon quantification of a size of followers of the candidate on the one or more social media systems;
determining a sixth quantifiable reputation measure that indicates clout of the candidate based at least in part upon a number of citations of contents of the candidate in one or more other posts by one or more other candidates in the one or more social media systems; and
storing the respective identification information of the candidate and two or more quantifiable reputation measures in one or more respective fields in the second sub-structure in the social profile data structure for the candidate, wherein
the two or more quantifiable reputation measures include at least one of the first quantifiable measure, the second quantifiable measure, the third quantifiable measure, the fourth quantifiable measure, the fifth quantifiable measure, or the six quantifiable measure, and
the reputation score comprises at least one of an influence contribution measure, or a clout contribution measure, or a generosity contribution measure, or an activity contribution measure, or an impact contribution measure, or an engagement contribution measure, or any combination thereof.

14. The computer program product of claim 11, further comprising reducing mis-categorization of the social data at least by performing a semantic analysis on the social data to remove noise or irrelevant data, wherein, only the public social network data but not the non-public data is subject to semantic filtering that reduces excess noise or irrelevant data, and a referral value of the respective referral values is determined based at least in part upon at least one of a type of interaction between an employee and a candidate of the candidates, or a type of referral, or a strength value, or a characteristic of a job opening of the one or more job openings, or any combination thereof.

15. The computer program product of claim 11, performing a multi-stage filtering on the social data further comprising:
for the public social network data, reducing mis-categorization of the public social network data at least by executing the second filtering module that applies the first filter on the public social network data with the second filtering level, wherein the first filter comprises a semantic filter; and
for the non-public data, executing the first filtering module that applies the semantic filter on the non-public data with the first filtering level, wherein the first filtering intensity is stronger than the second filtering strength.

16. The computer program product of claim 11, further comprising instructions which, when stored in the memory and executed by the processor, cause the processor to perform the set of acts, the set of acts further comprising initiating outreach at least by sending an automated electronic message to a candidate of the candidates when a referral value pertaining to the candidate exceeds a predetermined threshold, wherein a referral value of the respective referral values is determined based at least in part upon a type of interaction between an employee and the at least one connected user.

17. The computer program product of claim 11, further comprising instructions which, when stored in the memory and executed by the processor, cause the processor to perform the set of acts, the set of acts further comprising:
associating one or more rich-content tags with the public social network data based at least in part upon one or more social network connections and social network activities identified from the public social network data, associating the one or more rich-content tags with the public social network data comprising at least:
associating a rich-content tag of the one or more rich-content tags with one or more semantic vectors;
converting content data in the public social network data into a sematic vector at least by performing a semantic analysis;
comparing the semantic vector for the content data to the one or more semantic vectors associated with the rich-content tag; and
associating the content data with the rich-content tag based at least in part upon a comparison result of comparing the semantic vector for the content data to the one or more semantic vectors;
grouping the public social network data, which has been associated with the one or more rich-content tags, into a group for a candidate of the candidates;
identifying the plurality of users representing the candidates based at least in part upon the one or more rich-content tags;
monitoring the social network activities of the plurality of users; and
identifying a connection between a candidate of the candidates and a user identified from the non-public data, wherein the one or more online social data sources include at least one of a social network post, or a blog, or a web feed, or any combination thereof.

18. The computer program product of claim 11, further comprising instructions which, when stored in the memory and executed by the processor, cause the processor to perform the set of acts, the set of acts further comprising:
determining a referral value for a social network connection of the one or more social network connections based at least in part upon information that indicates endorsement for a candidate of the candidates, wherein the information comprises a type of interaction between the social network connection and the candidate, a type of referral by the social network connection for the candidate, a strength of the referral, or a characteristic of the one or more job openings,
the type of referral includes an explicit endorsement, a passive endorsement, an overt endorsement, and an inferred endorsement, and
the referral value has a range from a negative value to a positive value;
determining whether the at least one connection provides respective referrals for the candidate through multiple means; and
when it is determined that the at least one connection provides the respective referrals for the candidate through multiple means, determining the referral value at least by aggregating respective referral values of the respective referrals, wherein the respective referrals are weighted by one or more weights that are determined based at least in part upon similarity of a first job of the at least one connection and the one or more openings, wherein the one or more social network connections are identified using at least one or more social connection graphs.

19. A system comprising:
a social data access module comprising a social media application to receive content from one or more social media systems and analyzing the content to identify a plurality of users, wherein the plurality of users represents candidates for one or more job openings; and
a processor coupled to one or more modules that are stored in memory and include at least the social data access module and an enterprise application to perform a set of acts, the set of acts comprising:
identifying social data at the one or more modules that are stored in the memory, and the one or more modules comprise a social media application and an enterprise application, wherein the social data comprises public social network data that is retrieved by the social media application from one or more social media systems on one or more first servers via an external network component and further comprises non-public data that is retrieved by the enterprise application via an internal network component from one or more databases in a private network wherein identifying the social data comprises:
analyzing the public social network data from the one or more social media systems to identify a plurality of users, wherein the plurality of users represents candidates for one or more job openings;
identifying one or more social network connections associated with the plurality of users, wherein the one or more social network connections comprise identification data of the plurality of users and at least one connected user;
retrieving, from a data set in the one or more databases by the enterprise application, the non-public data for the at least one connected user, wherein the non-public data comprises employee data and is inaccessible from outside the private network; and
retrieving, from the one or more social media systems by the social media application, the public social network data of the at least one connected user;

storing respective identification information of the candidates in a first sub-structure of a social profile data structure and one or more respective quantifiable reputation measures for the candidates in a second sub-structure of the social profile data structure, wherein the one or more quantifiable measures respectively correspond to the respective identification information of the candidates;

determining respective referral values for the plurality of users at least by processing the social data, processing the social data comprising:

performing a multi-stage filtering on the social data, wherein performing the multi-stage filtering comprises:

receiving one or more inputs for a multi-stage filtering module that comprises a first stage filtering module and a second stage filtering module, wherein the first stage filtering module corresponds to a first filtering level and comprises at least one filter, the second stage filtering module corresponds to a second filtering level and comprises multiple filters, the first and the second filtering levels are respectively determined based at least in part upon respective sources of data for the first stage and the second stage filtering modules, the second filtering level is greater than the first filtering level, and the one or more inputs are received at a user interface via an input device;

identifying a data type for the social data, wherein the data type comprises a first type and a second type, the first type corresponding to the non-public data from the one or more databases in the private network, and the second type corresponding to public social network data from the one or more social media systems; and in response to the one or more inputs and the data type that has been identified, reducing an amount of data received at an enterprise server for cross-referencing the non-pubic data with the public social network data at least by:

for the non-public data having the first type and retrieved from the private network, executing the first stage filtering module with the first filtering level on at least some non-public data in the non-public data to generated reduced non-public data, wherein the first filtering level applied to the non-public data is smaller than the second filtering level, and for the public social network data having the second type and retrieved from the one or more social media systems external to the private network, executing the second filtering module that applies a first filter of the multiple filters in the second stage filtering module on at least some of the public social network data to generate first reduced public social network data; and executing the second filtering module that applies a second filter of the multiple filters to the first reduced public social network data to further reduce the first reduced public social network data into reduced public social network data, wherein second filtering level applied to the public social network data is greater than the first filtering level applied to the non-public data;

identifying corresponding respective quantifiable reputation measures for the plurality of users from the second sub-structure of the social profile data structure based at least in part upon the identification information of the plurality of users in the first sub-structure of the social profile data structure;

determining the respective referral values for the plurality of users based at least in part upon the corresponding respective quantifiable reputation measures for the plurality of users;

cross-referencing, by at least one of the one or more modules, the reduced non-public data with the reduced public social network data at least by associating the respective referral values with the one or more social network connections for the plurality of users based at least in part upon the corresponding respective quantifiable reputation measures, the reduced non-public data, and the reduced public social network data; and forwarding, by a messaging server, a plurality of electronic messages pertaining to the plurality of users at least by:

generating, by the messaging server, the plurality of electronic messages pertaining to at least the reduced public social network data; and routing and presenting the plurality of electronic messages to a plurality of destination computing devices based at least in part upon a plurality of tags associated with respective clusters of the public social network data.

20. The system of claim 19, further comprising:

forming, by at least one of the one or more modules, a reputation score that comprises at least one of an influence contribution measure, or a clout contribution measure, or a generosity contribution measure, or an activity contribution measure, or an impact contribution measure, or an engagement contribution measure, or any combination thereof;

generating a reputation variation graph structure comprising a plurality of contribution measures and a plurality of time periods based at least in part upon the reduced non-public data and the reduced public social network data;

determining a reputation score for the candidate of the candidates by using at least the reputation variation graph structure; and assessing how the candidate matches up to at least one of the one or more job openings based at least in part upon the reputation score.

* * * * *